United States Patent
Candy

(10) Patent No.: US 9,348,053 B2
(45) Date of Patent: May 24, 2016

(54) METAL DETECTOR WITH AT LEAST ONE TRANSMIT/RECEIVE SWITCH

(75) Inventor: Bruce Halcro Candy, Basket Range (AU)

(73) Assignee: Minelab Electronics Pty Limited, Torrensville, South Australia (AU)

(*) Notice: Subject to any disclaimer, the term of this patent is extended or adjusted under 35 U.S.C. 154(b) by 1090 days.

(21) Appl. No.: 13/326,179

(22) Filed: Dec. 14, 2011

(65) Prior Publication Data

US 2012/0146647 A1 Jun. 14, 2012

Related U.S. Application Data

(63) Continuation-in-part of application No. PCT/AU2011/000738, filed on Jun. 17, 2011.

(30) Foreign Application Priority Data

Jun. 18, 2010 (AU) .................... 2010902666
Sep. 14, 2010 (AU) .................... 2010904134

(51) Int. Cl.
*G01V 3/10* (2006.01)

(52) U.S. Cl.
CPC ............... *G01V 3/104* (2013.01); *G01V 3/105* (2013.01)

(58) Field of Classification Search
CPC .............................. G01V 3/104; G01V 3/105
See application file for complete search history.

(56) References Cited

U.S. PATENT DOCUMENTS 5,537,041 A * 7/1996 Candy ........................ 324/329
5,572,121 A * 11/1996 Beswick ................. G01V 3/10
324/225

(Continued)

OTHER PUBLICATIONS

International Search Report and Written Opinion of the International Searching Authority for International Application No. PCT/AU2011/000738, dated Jul. 26, 2011, 8 pages.

*Primary Examiner* — Tung X Nguyen
*Assistant Examiner* — Adam Clarke
(74) *Attorney, Agent, or Firm* — The Webb Law Firm

(57) ABSTRACT

The present invention relates to a method for detecting an electrically conducting target in soil, including the steps of generating a repeating transmit signal cycle of a fundamental period using transmit electronics, the repeating transmit signal cycle including a first period and a second period within each fundamental period; generating a transmit magnetic field using a magnetic field transmitter, based on the repeating transmit signal cycle, for transmission into the soil; receiving a receive magnetic field using a magnetic field receiver; producing a receive signal induced by the receive magnetic field; arranging for a current flowing through the magnetic field transmitter to flow to a first potential through a damping resistor during the second period for providing a damping effect on the current flowing through the magnetic field transmitter; arranging for the current flowing through the magnetic field transmitter to flow to a second potential, predominantly through an alternative path with a lower resistance than the damping resistor during the first period; monitoring the current flowing through the magnetic field transmitter to provide a control signal, the control signal, in effect, causing the second period to begin when the current flowing through the magnetic field transmitter is substantially zero; and processing the receive signal during at least part of the repeating transmit signal cycle to produce an indicator signal indicating the presence of an electrically conducting target when the target is within the influence of the transmit magnetic field.

31 Claims, 14 Drawing Sheets

(56) References Cited

U.S. PATENT DOCUMENTS

| | | |
|---|---|---|
| 5,576,624 A | 11/1996 | Candy |
| 6,002,256 A | 12/1999 | Slade |
| 6,583,625 B1 * | 6/2003 | Castle .................... G01V 3/104 324/225 |
| 6,636,044 B2 | 10/2003 | Candy |
| 6,653,838 B2 | 11/2003 | Candy |
| 6,686,742 B2 | 2/2004 | Candy |
| 7,652,477 B2 | 1/2010 | Candy |
| 2002/0180443 A1 * | 12/2002 | Fine et al. ..................... 324/338 |
| 2005/0104594 A1 * | 5/2005 | Nelson ................... G01V 3/104 324/326 |
| 2010/0019769 A1 | 1/2010 | Candy |
| 2010/0026485 A1 | 2/2010 | Candy |
| 2010/0141247 A1 | 6/2010 | Candy |
| 2010/0148960 A1 | 6/2010 | Candy |
| 2010/0283467 A1 | 11/2010 | Candy |

* cited by examiner

METAL DETECTOR WITH AT LEAST ONE TRANSMIT/RECEIVE SWITCH

CROSS REFERENCE TO RELATED APPLICATIONS

This application is a Continuation-In-Part of PCT/AU2011/000738 filed Jun. 17, 2011 which claims priority to AU Provisional Patent No. AU2010902666, filed Jun. 18, 2010; and AU Provisional Patent No. AU2010904134 filed Sep. 14, 2010. The entire content of each of these documents is hereby incorporated by reference.

INCORPORATION BY REFERENCE

The following documents are referred to in the present specification:
U.S. Pat. No. 5,576,624 entitled 'Pulse induction time domain metal detector';
U.S. Pat. No. 6,686,742 entitled 'Ground mineralization rejecting metal detector (power saving)';
U.S. Pat. No. 6,636,044 entitled 'Ground mineralization rejecting metal detector (receive signal weighting)';
US2010/0026485 entitled 'Metal detector with improved magnetic soil response cancellation';
US2010/0148960 entitled 'Metal detector for salt soil';
US2010/0283467 entitles 'Metal detector with improved magnetic response application';
US2010/0141247 entitled 'constant current metal detector with driven transmit coil';
US2010/0019769 entitled 'metal detector having constant reactive transmit voltage applied to a transmit coil';
U.S. Pat. No. 6,653,838 entitled 'Ground mineralization rejecting metal detector (transmit signal)'; and
U.S. Pat. No. 7,652,477 entitled 'Multi-frequency metal detector having constant reactive transmit voltage applied to a transmit coil'.

TECHNICAL FIELD

This invention relates to metal detectors that are time-domain detectors which include a transmit/receive switch (T/R switch).

BACKGROUND

The general forms of most metal detectors that interrogate soil for detecting an electrically conducting target are either hand-held battery-operated units, conveyor-mounted units, or vehicle-mounted units. Examples of hand-held products include detectors used to locate gold, explosive landmines or ordnance, coins and treasure. Examples of conveyor-mounted units include fine gold detectors in ore mining operations, and an example of a vehicle-mounted unit includes a unit to locate buried land mines.

These electronic metal detectors usually consist of transmit electronics generating a repeating transmit signal cycle of a fundamental period, which is applied to an inductor, for example a transmit coil, which transmits a resulting alternating magnetic field sometimes referred to as a transmit magnetic field. Time domain metal detectors usually include switching electronics, within the transmit electronics, that switches various voltages from various power supplies to the transmit coil for various periods in the repeating transmit signal cycle.

Metal detectors contain receive electronics which processes a receive signal from a measured receive magnetic field to produce an indicator signal, the indicator signal at least indicating the presence of at least some metal targets within the influence of the transmit magnetic field.

Time domain metal detectors include pulse induction (PI) or PI-like metal detectors. It is possible for this technology to transmit and receive using the same inductor, often called a "mono-loop" coil. This requires some sort of transmit/receive switch, sometimes called a "T/R switch".

There are several problems with the conventional T/R switches used in PI metal detectors. One common method that avoids a conventional T/R switch, is to connect a damping resistor of the transmit/receive coil (mono-loop) to an inverting input of a low-noise preamplifier of a detector, wired up so this input is a virtual earth. However, as this damping resistor is typically roughly 500Ω for typical suitable contemporary coils, the Johnson noise in this damping resistor is approximately 3 nV/sqrt(Hz), whereas the input noise of contemporary preamplifiers is about 1 nV/sqrt(Hz) and about 2 pA/sqrt(Hz), and hence the total input equivalent noise of this system is approximately 3.3 nV/sqrt(Hz). In contrast, if a low on resistance "isolating" T/R switch is connected between the transmit/receive coil and input to the preamplifier as is the case in some commercial products, the damping resistor being connected to ground, the total noise due to the T/R switch series resistance is typically insignificant, and hence for the above figures, a signal-to-noise ratio improvement of about 3 times is possible using a low on resistance isolating T/R switch rather than connecting the damping resistor to an inverting input of the preamplifier. The disadvantage of using an isolating T/R switch is that the turn-on charge injection pulse of the T/R switch induces another decaying signal, after the back-emf decaying signal, into the transmit/receive coil (mono-loop). This charge injection pulse first needs to decay to an acceptably low level before the commencement of synchronous demodulation or sampling during a receive period, and hence a system using a isolating T/R switch requires a longer delay between the cessation of transmission and commencement of demodulation compared to the arrangement with the damping resistor feeding to an input of the preamplifier.

This series T/R switch usually consists of small signal FETs that are in a switched off state during transmission, and in a switched on state during receive periods, once the back-emf has decayed to about a volt or less, thus switching the coil to the preamplifier.

While a nulled coil arrangement (such as the well-known "double D") requires no isolating T/R switch, it is often desirable to use a transmit/receive mono-loop coil as it has a superior detection range.

It is often desirable to detect fast time constant metal targets such as fine gold nuggets, low-metal content mines containing small bits of metal, fine gold chains etc. In PI detectors, this requires that receive sampling or synchronous demodulation commence as soon as possible following a termination of the "back-emf" or transmit high-voltage period and the commencement of a receive period.

WO2009/155668 discloses PI-like waveforms where the transmit coil current is controlled to be approximately zero during a zero-voltage receive period, without the use of a T/R switch. However, that arrangement has to use a separate transmit and receive coil, as the transmit coil is always being driven by the transmit electronics. Another limitation of that disclosed is that the zero current, during a zero-voltage receive period, is limited in accuracy by the accuracy of the electronics. The invention described herein may also produce zero transmit coil current during zero-voltage periods when a shunt T/R switch is switched off, but the arrangement may also facilitate the use of mono-loop coils where the receive and transmit windings are the same winding, rather than separate receive and transmit windings.

BRIEF SUMMARY OF THE INVENTION

According to a first aspect of the present invention, there is provided a method for detecting an electrically conducting target in soil, including the steps of: generating a repeating transmit signal cycle of a fundamental period using transmit electronics, the repeating transmit signal cycle including a first period and a second period within each fundamental period; generating a transmit magnetic field using a magnetic field transmitter, based on the repeating transmit signal cycle, for transmission into the soil; receiving a receive magnetic field using a magnetic field receiver; producing a receive signal induced by the receive magnetic field; arranging for a current flowing through the magnetic field transmitter to flow to a first potential through a damping resistor during the second period for providing a damping effect on the current flowing through the magnetic field transmitter; arranging for the current flowing through the magnetic field transmitter to flow to a second potential, predominantly through an alternative path with a lower resistance than the damping resistor during the first period; monitoring the current flowing through the magnetic field transmitter to provide a control signal, the control signal, in effect, causing the second period to begin when the current flowing through the magnetic field transmitter is substantially zero; and processing the receive signal during at least part of the repeating transmit signal cycle to produce an indicator signal indicating the presence of an electrically conducting target when the target is within the influence of the transmit magnetic field.

In one form, the first period is a transmit period with finite non-zero current flowing through the magnetic field transmitter, and wherein the second period is a zero-transmit period with substantially zero current flowing through the magnetic field transmitter. In one form, the receive signal is processed during at least part of the second period. In one form, the magnetic field transmitter and the magnetic field receiver are provided by a single inductive coil. In one form, the damping resistor is selected to be of a value required for approximately critical damping of the magnetic field transmitter during at least a part of the second period.

In one form, the first period includes a zero reactive voltage period with non-zero constant current flowing through the magnetic field transmitter. In one form, the receive signal is processed during at least part of the zero reactive voltage period using a second magnetic field receiver.

In one form, the method further includes the step of: sensing the current flowing through the magnetic field transmitter during at least part of the zero reactive voltage period to control part of a characteristic of the repeating transmit signal cycle for maintaining constant the current of the magnetic field transmitter during at least part of the zero reactive voltage period. In one form, the part of the characteristic of the repeating transmit signal cycle controlled includes a duration of a non-zero reactive voltage period within the first period. In one form, the first period includes at least: a first high-voltage period of a first polarity; a first zero reactive voltage period immediately following the first high-voltage period; and a second high-voltage period of an opposite voltage polarity to the first polarity immediately following the first zero reactive voltage period.

In one form, the receive signal during at least part of the second period produces a soil signal dependent upon at least signals from soil, the soil illuminated by the transmit magnetic field during the first period, and wherein processing of the receive signal during at least part of the first period produces a first processed signal, a component of the first processed signal being directly proportional to an instantaneous non-zero reactive voltage across the magnetic field transmitter, and a further component of the first processed signal being dependent upon the soil signal, wherein a proportion of the soil signal is subtracted from the first processed signal to produce a reactive signal such that the reactive signal is substantially directly proportional to the instantaneous reactive voltage and being substantially independent of the soil signal. In one form, processing of the receive signal during the zero reactive voltage period produces a second processed signal, a component of the second processed signal being dependent upon a component of the reactive signal, and a further component of the second processed signal being approximately independent of the soil signal, and the further processing of the reactive signal includes subtracting a proportion of the reactive signal from the second processed signal to produce a reactive balanced signal such that the reactive balanced signal is substantially independent of the reactive signal, and further processing the reactive balanced signal to produce the indicator signal. In one form, processing of the reactive balanced signal includes adding a proportion of the soil signal to the reactive balanced signal to produce a ground balanced signal such that the ground balanced signal is substantially independent of signals from soil, the soil illuminated by the transmit magnetic field during the first period.

In one form, the signals from soil includes resistive components substantially independent of frequencies within an effective receive bandwidth of the magnetic field receiver.

In one form, the signals from soil includes log-linear frequency-dependent resistive components within an effective receive bandwidth of the magnetic field receiver.

In one form, the first period precedes the second period, and the second period is followed by a third period, the third period being a transmit period which precedes a fourth period, the fourth period being a zero-transmit period; wherein the third period includes: a third high-voltage period of a polarity opposite to the first polarity; a second zero reactive voltage period immediately following the third high-voltage period; and a fourth high-voltage period of the same voltage polarity as the first polarity immediately following the second zero reactive voltage period.

In one form, processing of the receive signal includes synchronously demodulating the receive signal with a first synchronous demodulation multiplication function during the zero reactive voltage period to produce a first output signal, synchronously demodulating the receive signal with a second synchronous demodulation multiplication function during the second period, to produce a second output signal, and further processing the first and second output signal to produce the indicator signal.

In one form, processing of the receive signal includes processing the receive signal during at least a part of the zero reactive voltage period produces a first output signal, and processing the receive signal during at least a part of the second period produces a second output signal, and further processing the first and second output signal to produce the indicator signal.

In one form, processing the receive signal during at least part of the second period produces at least two processed signals, a first processed signal being more dependent upon a rate of change of environmental static fields applied to the magnetic field receiver than is a second processed signal; and a signal proportional to the first processed signal is subtracted from the second processed signal to produce a signal substantially independent of the rate of change of environmental static fields applied to the magnetic field receiver, and a further processing of the signal substantially independent of the rate of change of environmental static fields applied to the magnetic field receiver produces the indicator signal.

In one form, the receive signal during at least part of the second period produces a first processed signal and processing the receive signal during at least part of the first period produces a third processed signal, the first processed signal being more dependent upon a rate of change of environmental static fields applied to the magnetic field receiver than is the third processed signal; and a signal proportional to the first processed signal is subtracted from the third processed signal to produce a signal substantially independent of the rate of change of environmental static fields applied to the magnetic field receiver, and a further processing of the signal substantially independent of the rate of change of environmental static fields applied to the magnetic field receiver produces the indicator signal.

In one form, the transmit electronics includes a transmit/receive switch controlled by the control signal, at least a first element of the transmit/receive switch is controlled to be in either a switched on state or a switched off state, wherein an effective series dynamic resistance of the first element when in a switched on state is lower than the effective series dynamic resistance of the first element when in a switched off state, and wherein the first element is in a switched on state during the first period to provide an alternative path with lower resistance than the damping resistor for the current flowing through the magnetic field transmitter to flow to the second potential, and wherein the first element is in a switched off state during the second period such that the current flowing through the magnetic field transmitter flows to the first potential through the damping resistor.

In one form, the first element is in the switched off state when the current flowing through the magnetic field transmitter is substantially zero. In one form, at least 95% of a current flowing through the magnetic field transmitter flows through the first element when the current flowing through the magnetic field transmitter is at a maximum during periods while the first element is in the switched on state.

In one form, the transmit/receive switch further includes a second element connected to the first element that is controlled by a control circuitry to be in either a switched on state or a switched off state, wherein an effective series dynamic resistance of the second element while in a switched on state is lower than the effective series dynamic resistance of the second element while in a switched off state, wherein the method includes the step of: galvanically isolating the control circuitry from the transmit electronics during at least a part of the second period when the first element is in a switched off state and the second element is in a switched on state, wherein the second element is in a switched on state for at least part of the first period, and wherein at least 95% of the current flowing through the magnetic field transmitter flows through the second element when the current flowing through the magnetic field transmitter is at a maximum while the second element is in the switched on state.

In one form, at least 95% of the current flowing through the magnetic field transmitter flows through both the second element and the first element at least when the magnetic field transmitter current is at a maximum during the periods when both the first element and the second element are in the switched on state.

In one form, the first element includes a field-effect Transistor which is controlled to be in a switched off state during at least part of the second period, and controlled to be in a switched on state during at least part of the first period.

In one form, the first element includes a Bipolar Junction Transistor which is controlled to be in a switched off state during at least part of the second period, and controlled to be in a switched on state during a least part of the first period. In one form, the damping resistor is connected in parallel with the first element. In one form, the first potential is the same as the second potential. In one form, either or both of the first and second potentials are zero.

According to another aspect of the present invention, there is provided metal detector configurable to perform the first aspect of the present invention, and/or its various forms.

The invention is pertinent to metal detectors for which accurate ground balancing is required, that is high gain metal detectors capable of cancelling out signals from soil accurately, such as "mineralised soil" containing viscous superparamagnetic ferrites and saline soil.

A detailed description of one or more embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications, and equivalents. For the purpose of example, numerous specific details are set forth in the following description in order to provide a thorough understanding of the present invention. The present invention may be practised according to the claims without some or all of these specific details. For the purpose of clarity, technical material that is known in the technical fields related to the invention has not been described in detail so that the present invention is not unnecessarily obscured.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The reference to any prior art in this specification is not, and should not be taken as, an acknowledgment or any form of suggestion that such prior art forms part of the common general knowledge of the technical field.

To assist with the understanding of this invention, reference will now be made to the drawings:

DETAILED DESCRIPTION OF THE INVENTION

Figure 1:
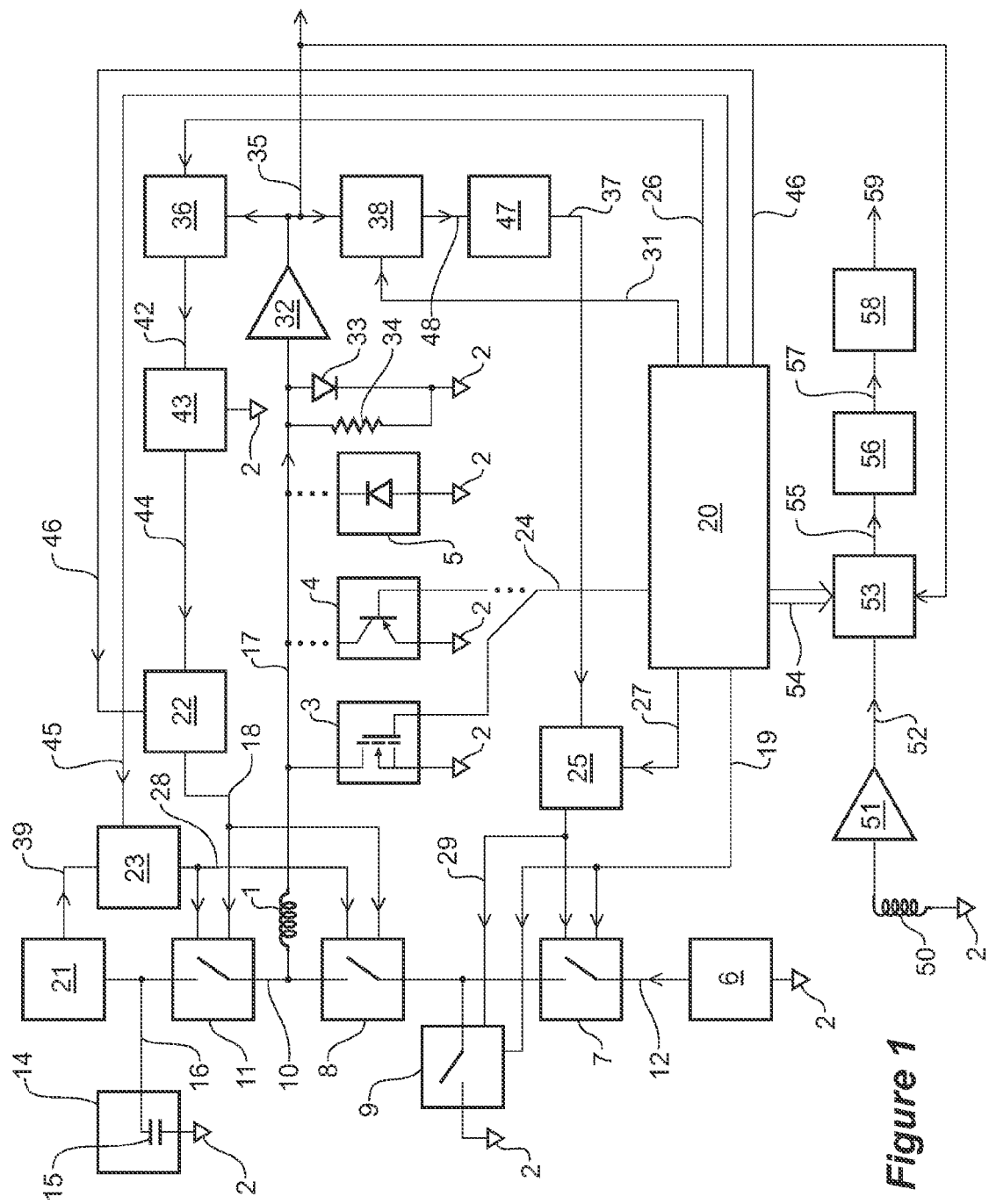
FIG. 1 depicts a simple block electronic circuit diagram of one embodiment of the invention with an electronic system capable of producing a repeating transmit signal cycle.

Herein the expressions are defined as follows:

1. Low-Pass Filters:

This includes averagers or integrators. When referring to a low-pass filter following a receive signal synchronous demodulator, this at least substantially removes transmit related frequencies. For example, the transmit fundamental frequency may be of the order of kHz, and the cut-off frequency of the post-synchronous demodulator low-pass filter may be of the order of Hz or 10 Hz.

2. High-Pass Filters:

This includes differentiators. When a high-pass filter is connected to an output of post-synchronous demodulator low-pass filter, the high-pass filter may have a cut-off frequency of the order of 0.1 Hz or 1 Hz. In some embodiments, the high-pass filter may work together with a low-pass filter, thus providing band-pass filtering. Alternatively a band-pass filter may be connected to an output of the synchronous demodulators or samplers, producing both low-pass and high-pass filtering, and the order of the high-pass and low-pass filters may be swapped.

3. Synchronous Demodulators:

These are usually connected to the output of a preamplifier connected to a receive coil. An alternative term is "synchronous rectifiers," and also may include the techniques of sampling, or period averaging, in combination with a post-demodulator low-pass filter.

4. Receive Electronics:

Receive electronics may include just analogue or digital signal processing (DSP) or a combination of them. For simplicity, assume the electronics is "ideal," that is perfectly linear with no distortion, no noise, no eddy current signals in the components of receive electronics, stray capacitance or inductance etc. The receive electronics receives a receive signal from a magnetic field receiver, usually a receive coil, as an induced unloaded emf, that is usually amplified, then fed to inputs of the synchronous demodulators. The outputs of the synchronous demodulators are filtered as above, and the outputs of the filters are further processed.

5. Reactive Signal:

This has two meanings, and a person skilled in the art would be able to differentiate the meanings. The first is a signal at the input or output of the receive electronics, e.g. an induced emf in a receive coil, or an amplified signal of the said induced emf, such that the signal is identical in waveform to the transmit coil reactive voltage. The second, more commonly understood, meaning used herein unless otherwise stated, is a signal at the output of a post-synchronous demodulator low-pass filter or high-pass filter, such that the reactive signal at least substantially responds to the detection of a "zero-loss" highly magnetically permeable target (e.g. ferrite) or a super-conductor within the influence of the transmit magnetic field and is associated with the detection of targets with zero energy dissipation.

6. Resistive Signal:

This likewise has two meanings, and a person skilled in the art would be able to differentiate the meanings. The first is a signal at the input or output of the receive electronics e.g. that induced in a receive coil, or at the output of preamplifier connected to the receive coil, which is manifest by a signal responsive to the history of the applied transmit signal, rather than the instantaneous value as is the case for the reactive signal. The second, more commonly understood, meaning used herein unless otherwise stated, means a signal at the output of a post-synchronous demodulator low-pass filter or high-pass filter, such that the resistive signal at least substantially responds to the presence of eddy currents in a target or viscous superparamagnetic components within the influence of the transmit magnetic field, and is associated with energy dissipation in the target. An ideal resistive signal will produce no response to the presence of highly permeable "zero energy loss" targets (e.g. high quality ferrites or a super conductor) within the influence of the transmit magnetic field. The magnetic responses from viscous superparamagnetic components in soil are sometimes referred to as VRM (viscous remanent magnetism).

7. Frequency Domain Metal Detector:

Frequency domain metal detectors effectively respond to only selected frequencies, either by transmitting only these frequencies as sine-waves, or by employing sine-wave demodulation functions at these frequencies, or by low-pass or band-pass filters in the preamplifier that result in effective mathematical sine-wave demodulation, even if the demodulation functions are not sine-waves with each having a fundamental frequency at a selected frequency.

8. Time Domain Metal Detector:

Time domain metal detectors usually include switching electronics, within the transmit electronics, that switches various voltages from various power supplies to the transmit coil for various periods in the repeating transmit signal cycle. Time domain detectors essentially demodulate broadband receive signals, or at least sidebands of the fundamental frequency plus harmonics. Examples include PI or PI-like transmit waveforms, rectangular waveforms (square-wave or multi-period), and examples are given in the incorporated patents.

9. Transmit Coil Reactive Voltage:

Assume that the transmit coil may be represented as a series inductance L and series resistance R (when remote from targets or soil) and $\omega=R/L$. The transmit coil reactive voltage is defined to be proportional to $dI/dt$ where I is the current flowing though the transmit coil. A signal induced in an ideal receive coil as an emf directly from the transmit coil is directly proportional to the transmit coil reactive voltage. When the field of the transmit coil interacts with targets or soil, both its effective inductance and resistance may be modulated by the target or soil. Then, $dI/dt$ may include effects from both resistive and reactive components. For example, if the voltage applied to the transmit coil is a constant voltage V, then ideally $I=V/R[1-\exp(-\omega t)]$ when $I=0$ at $t=0$. However, when soil components interact with the transmit coil, I includes a component due to the soil resistive and reactive components, and hence $dI/dt$ is likewise affected. As the non-dissipative "reactive" soil magnetic component is typically much greater than the dissipative "resistive" soil components (VRM and saline eddy currents), it is generally taken to be that only the non-dissipative component of L changes as the coil passes over soil and that this approximation is sufficiently accurate.

10. Ground Balanced Signal:

This refers to a processed signal that responds to the detection of a variety of metal targets, but not soil, in particular magnetic soil with a significant VRM component. Results utilizing WO 2008/040089 have shown that the VRM time constants are distributed very accurately in a log-linear distribution that is very nearly a log-uniform distribution. For a magnetic step, the receive emf in an ideal receive coil, from soil with a purely log-uniform VRM covering an "infinite" frequency range, follows the well-known l/t response. However, for far greater accuracy, the small log-linear component should be included which adds kLn(t)/t to the l/t response, where k depends on the local soil. It is assumed that soils cited herein are accurately thus described, and "ground balanced signals" include balancing to the log-linear and log-uniform component simultaneously as described in WO 2008/040089, unless otherwise stated.

11. Effective Receive Bandwidth of the Magnetic Field Receiver and Receive Electronics:

This effective bandwidth includes those of the magnetic field receiver (e.g. receive coil), preamplifier connected between the magnetic field receiver and synchronous demodulators, and frequency spectrum of the synchronous demodulation multiplication waveforms. Results utilizing WO 2008/040089 have shown that the VRM time constants are distributed very accurately in a log-linear distribution that is very nearly a log-uniform distribution, covering a frequency range well beyond the typical state-of-the-art metal detector effective receive bandwidth of the magnetic field receiver and receive electronics at the time of writing (receive electronics high-frequency cut-off being typically of the order of 1 MHz, e.g. 0.5 MHz in some well-known commercial products).

With reference to FIG. 1, the receive electronics consists of 50, 51, 52, 53, 54, 55, 56, 57, 58 and 59; all other elements being the transmit electronics and timing electronics 20.

A second end 10 of transmit coil 1 is connected to switches 8 and 11. Switch 11 is connected to an output of power source 14 which is a high-voltage power source with an output of a high voltage, e.g. +180 V. Switch 8 is connected to switch 7 and switch 9. Switch 9 is connected to zero volts 2 of the transmit electronics, which is also the general system earth. Switch 7 is connected to an output 12 of power source 6 which is a low-voltage power source of opposite polarity to high-voltage power source 14, has a low output voltage, e.g. −5 V. The switching electronics of the transmit electronics consists of switches 3 or 4, and switches 7, 8, 9, and 11 that are controlled to be in a switched on state or switched off state via timing electronics 20, through control signals at 24, 19, 27, 45, 46 and 26 and pulse width modulators 22, 23 and 25. Alternatively, switches 3 or 4 can be replaced by diode 5 which will be in a switched on or switched off state automatically, depending on the voltage across the diode 5. A first end 17 of transmit coil 1 is connected to a first element of a T/R switch which may be a field-effect transistor (FET) 3, or a bipolar junction transistor (BJT) 4 (or anti-parallel BJT pair), or diodes 5 (or anti-parallel diode pair), or a combination, FET 3 or a BJT 4 being controlled to be switched on or off by a control signal at 24 generated in a timing electronics 20. The first element of T/R switch (3 or 4 or 5) connects the first end 17 of the transmit coil 1 to zero volts 2 of the transmit electronics when in a switched on state. The first element of T/R switch (3 or 4 or 5) and the first end 17 of transmit coil 1 are connected to an input of a preamplifier 32 to receive a receive signal from transmit coil 1. This receive signal consists of signals across the first element of T/R switch (3 or 4 or 5) from the transmit coil 1 when it is being used to generate a transmit magnetic field, and also from the transmit coil 1 when it is be used as the receive coil to receive a receive magnetic field during a receive period.

While the terms "transmit coil" and "receive coil" are used in the specification, the transmit coil and the receive coil are not necessarily round or oval in shape. In fact, any magnetic field transmitter or receiver deemed suitable by a person skilled in the art in the field of metal detection may be used as the transmit coil and the receive coil.

The first element of T/R switch, the FET 3, or BJTs 4 or diodes 5, may be in series with a relatively low impedance network, e.g. a very low-valued resistor across which transmit coil current may be measured.

The high-voltage power source 14 includes capacitor 15 that is connected from an output 16 of high-voltage power source 14 to zero volts 2 of the transmit electronics. Capacitor 15 may, for some waveforms, be charged and discharged by energy in the transmit coil such that the voltage across it is stable without the need for additional power input. In these circumstances, high-voltage power source 14 may consist of capacitor 15 alone.

Figure 2:
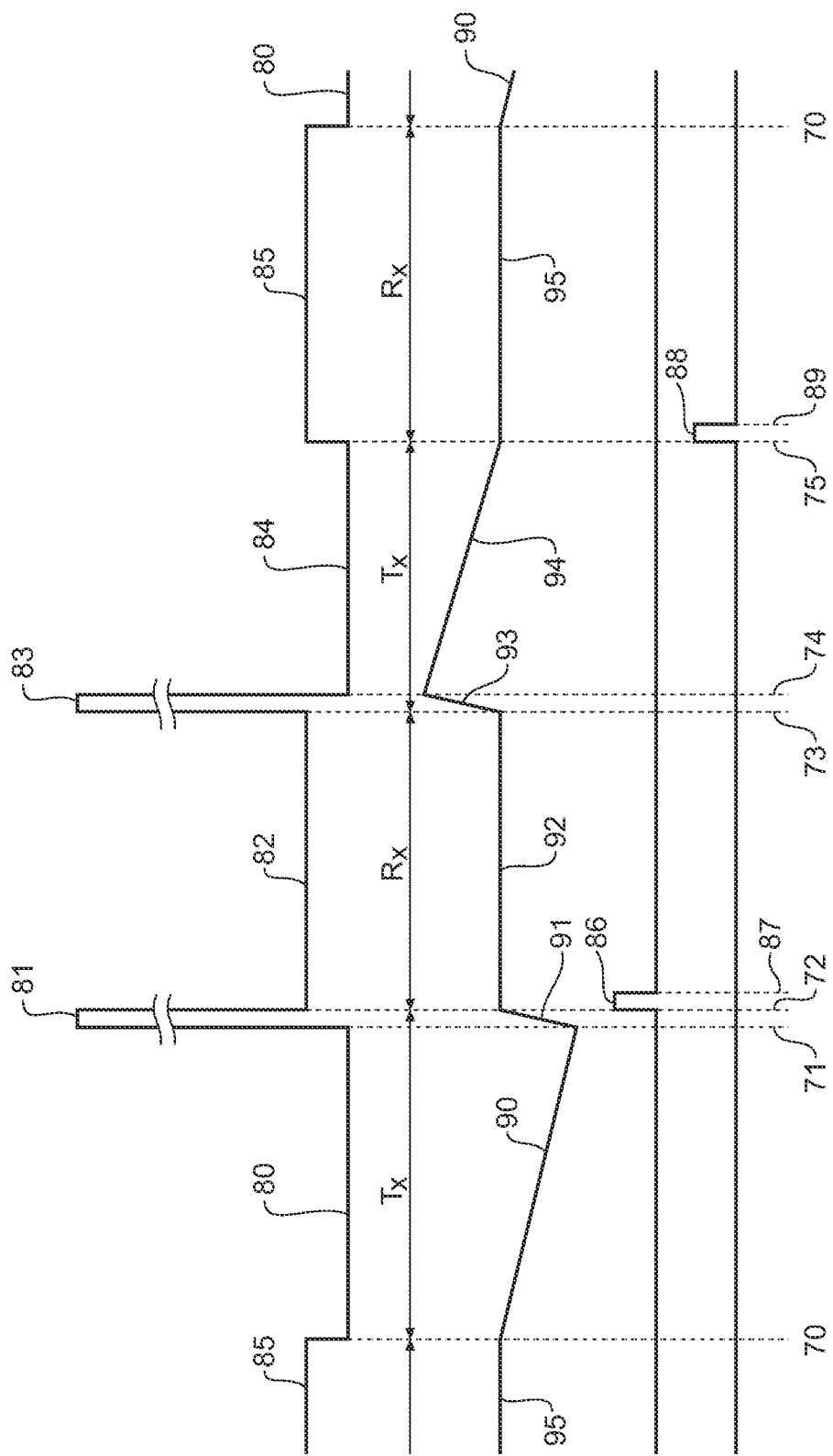
FIG. 2 is an example depicting suitable waveforms for FIG. 1.

With reference to FIG. 2, a repeating transmit signal cycle shown as an applied voltage transmit waveform across the transmit coil 1 is shown as 80, 81, 82, 83, 84 and 85 with switching times at times 70, 71, 72, 73, 74 and 75. The fundamental period is between successive times 70. A low negative voltage 80, from low-voltage power source 6, is switched to the second end 10 of transmit coil 1 by switches 8 via 7 switching to low-voltage power source 6 during a period from time 70 to time 71, while switches 9 and 11 are in a switched off state. From time 71 to time 72, a positive high voltage 81 (not drawn to scale) from high-voltage power source 14 is switched to the second end 10 of the transmit coil 1 by switch 11, with switch 8 being switched off. Thereafter from time 72 to time 73, zero volts 82 is switched to the transmit coil 1 when switch 8 via, switch 9, is switched to zero volts 2 of the transmit electronics. A first element of the T/R switch 3, 4 or 5 is switched on for a period from time 70 to time 72, and off from time 72 to time 73 during a first zero-transmit period. Thereafter from time 73 to time 74, the high voltage 83 from high-voltage power source 14 (or capacitor 15) is switched to the transmit coil 1 by switch 11 switching to a switched on state, switch 8 being switched to a switched off state and the first element of the T/R switch 3, 4 or 5 being switched on. Thereafter, during a period from time 74 to time 75, the low voltage 84 from low-voltage power source 6 is switched to the second end 10 of transmit coil 1 by switch 8 via 7 switching to low-voltage power source 6, while switches 9 and 11 are in a switched off state and the first element of the T/R switch 3, 4 or 5 is in a switched on state. Thereafter, from time 75 to time 70, zero volts 85 is switched to the transmit coil 1 when switch 8 via switch 9 is switched to zero volts 2 of the transmit electronics. The first element of the T/R switch 3, 4 or 5 is in a switched on state for a period between times 73 and 75, and off between times 75 and 70 during a second zero-transmit period. The transmit signal cycle then repeats. Hence in this example, the repeating transmit signal cycle includes the two zero-transmit periods, from time 72 to time 73 and from time 75 to time 70, and two transmit periods, from time 70 to time 72 and from time 73 to time 75, within the fundamental period. The voltage across capacitor 15 is stable without the need for additional power input, except that this voltage will contain some ripple from charging and discharging, and an average of this voltage may vary slightly as the inductance of the transmit coil is modulated by magnetic soil, if not controlled to be stabilised.

A transmit period is a period with finite non-zero current flowing through the magnetic field transmitter, and a zero-transmit period is a period with substantially zero current flowing through the magnetic field transmitter.

The transmit coil current waveform increases in magnitude 90 during the low-voltage period between times 70 and 71 (e.g. a −5 V period) from zero at time 70 to a negative peak at time 71. The current waveform representing the current flowing through the transmit coil (or commonly known as transmit coil current) is shown as a linear ramp for simplicity, but in reality it follows a trace approximating $-5/R(1-\exp(-Rt/L))$ where R is the effective series resistance of the transmit coil plus electronics output series resistance, and L is the inductance of the transmit coil. During the following high-voltage period between times 71 and 72, the transmit coil current 91 rapidly goes to zero. For the zero-transmit period between times 72 and 73, the transmit coil current 92 is zero. For the high-voltage period between times 73 and 74, the transmit coil current 93 rapidly increases to a positive peak. Thereafter, for a low-voltage period between times 74 and 75 (e.g. a −5 V period), the positive transmit coil current 94 decreases to zero. Again, this is not a linear ramp as shown for simplicity, but follows a trace approximating $I_{max}-5/R(1-\exp(-Rt/L))$. Following this low-voltage period is another zero-transmit period between times 75 and 70 where the transmit coil current 95 is zero.

A resistive load in the form of a resistor 34 is connected to a first end 17 of transmit coil 1 and to zero volts 2 of the transmit electronics, such that the resistance is selected to be of a value required for approximate critical damping of transmit coil 1 when the first element of T/R switch 3 or 4 or 5 is of relatively high impedance when in a switched off state as compared to its impedance when in a switched on state. The first element of T/R switch (3 or 4 or 5) is arranged such that a residual current through the transmit coil 1 flows to a first potential (in this case zero volts 2) through the resistor 34 during the zero-transmit period for providing a damping effect on the current flowing through the transmit coil 1. Further, the first element of T/R switch (3 or 4 or 5) is arranged such that the current flowing through the transmit coil 1 flows to a second potential, predominantly through an alternative path with a lower resistance than the resistor 34 during the transmit period (in this case, the path provided by the first element).

The first potential and the second potential need not be zero volts as long as the first potential and the second potential are chosen such that the functionality herein described is not affected. For example, the invention works with the zero volts 2 replaced by 0.5 volts. Also, the first potential and the second potential need not be the same. For example, during the zero-transmit period the zero volts 2 can be replaced by a potential of 1.5 V (first potential), and during the transmit period, zero volts 2 can be replaced by a potential of −1 V (second potential).

A small-signal diode 33 is connected across the T/R switch to limit the voltage at the preamplifier 32 input when the first element is a FET 3 or BJT 4. It shunts any excess positive transmit coil current, during the initial period of the zero-transmit periods, to zero volts 2 of the transmit electronics.

In order to accurately set the initial transmit coil current at the commencement of the zero-transmit periods, it is necessary to implement at least one negative feedback loop for each zero-transmit period of a fundamental period. In FIG. 2 there are two such zero-transmit periods, and hence a first and a second negative feedback loop are required. It is best if the voltage across capacitor 15 (the high-voltage power source 14) is set to a fixed value for consistent performance. This may be achieved by an active power supply, or by the use of another negative feedback loop, a third negative feedback loop, which controls the transmit waveform to maintain this said high voltage.

The first negative feedback loop, consisting of preamplifier 32, sampler or synchronous demodulator 36, loop amplifier 43, and pulse width modulator 22, measures and maintains the initial transmit coil current at the commencement of the zero-transmit period between times 72 and 73, which includes at least one receive period. Sampler or synchronous demodulator 36 samples or averages in the time window 86 the output 35 of the preamplifier 32 between times 72 and 87. The output 42 of the sampler or synchronous demodulator 36 is applied to an input of loop amplifier 43, which compares the signal at 42 to the zero voltage 2 of the transmit electronics. An output 44 of loop amplifier 43 is connected to a control input of pulse width modulator 22, to which a pulse from an output 46 of the timing electronics 20 is applied. The pulse width modulator 22 controls the width of the pulse it emits at its output 18; in this example the emitted output 18 controls the time 71. This affects the magnitude of the change in transmit coil current 91 (and 90), such that the first negative feedback loop maintains the average transmit coil current between times 72 and 87 at approximately zero which will produce approximately 0 volts across resistor 34.

The second negative feedback loop, consisting of preamplifier 32, sampler or synchronous demodulator 38, loop amplifier 47, and pulse width modulator 25, measures and maintains the initial transmit coil current at the commencement of the zero-transmit period between times 75 and 70, which includes at least one receive period. Sampler or synchronous demodulator 38 samples or averages, in the time window 88, the output 35 of the preamplifier 32 between times 75 and 89. The output 48 of the sampler or synchronous demodulator 38 is applied to an input of loop amplifier 47, which compares the signal at 48 to the zero voltage 2 of the transmit electronics. An output 37 of the loop amplifier 47 is connected to a control input of pulse width modulator 25, to which a pulse from an output 27 of the timing electronics 20 is applied. The pulse width modulator 25 controls the width of the pulse it emits at its output 29; in this example the emitted pulse 29 controls the time 75. This affects the magnitude of the change in transmit coil current 93 and 94, such that the second negative feedback loop maintains the average of the transmit coil current between times 75 and 89 to be approximately zero.

The third negative feedback loop, consisting of loop amplifier 21, and pulse width modulator 23, measures and maintains the high voltage at 16. The output 16 of the high-voltage power source 14, in this example consisting of capacitor 15, is applied to an input of loop amplifier 21, which compares the high voltage to a reference voltage. An output 39 of loop amplifier 21 is connected to a control input of pulse width modulator 23, to which a pulse from an output 45 of the timing electronics 20 is applied. The pulse width modulator 23 controls the width of a pulse 28, emitted by the pulse width modulator 23 and fed to switches 11 and 8; in this example the time 73 or times 71 and 72 together can be controlled by this system. This affects the magnitude of the average voltage of the high-voltage power source 14, such that the third negative feedback loop maintains the said high voltage.

In an embodiment of this invention, the durations of three of, the high-voltage periods time 71 to time 72 and time 73 to time 74, and the low-voltage periods time 70 to time 71 and time 74 to time 75, may be controlled by the three negative feedback loops with the transmit coil current measured during the period from time 72 to time 87, and measured during the period from time 75 to time 89, and the high voltage as inputs in numerous different combinations. In one embodiment, times 70, 71 and 73 or 74 are controlled, with times 72 and 75 fixed to simplify receive synchronous demodulation relative to times 72 and 75. In another embodiment, the first negative feedback loop is to be as described above, but the second negative feedback loop controls time 70 via a pulse width modulator with the high voltage as its input to its negative feedback amplifier, and the third negative feedback loop controls time 73 or 74 via a pulse width modulator with the transmit coil current at time 75 (to 89) as its input to its negative feedback loop amplifier. Alternatively, the magnitude of the low voltage may be varied by a negative feedback loop with one of the above measured variables as an input.

Another alternative is to control the high voltage by the use of a regulated high-voltage power source (e.g. a 180 V switched mode power supply with its associated negative feedback loop to control the output voltage), then just two negative feedback loops are required to control the transmit coil currents to approximately zero at the commencement of the zero-transmit periods.

At the commencement of the zero-transmit periods the first element of T/R switch may either be immediately opened (switched off) as described above, or remain in a switched on state for a brief period to ensure that the initial voltage is at zero. Whichever method is used, when the T/R switch is switched to a switched off state, the voltage at the input of preamplifier 32 includes transients from any residual transmit coil current and charge injection from controlled T/R switches (such as the FET 3 or BJTs 4). The load presented at the first end 17 of the transmit coil 1 is the impedance of the transmit coil 1, transmit and receive electronics at 17, including the limiting diode 33 and diode(s) within the FET 3 or BJT 4 (in the cases where either FET 3 or BJT 4 is used), and the damping resistor 34. The said transients decay rapidly, according to the time constant approximately equal to L/R where R is the value of the damping resistor 34 and L is an inductance, substantially the inductance of the transmit coil. This transient voltage is amplified by the preamplifier 32 and may cause saturation at the preamplifier output 35 for short periods. Unlike the systems described in US2010/0019769 and WO 2009/155668, where the transmit current may be monitored across a low-valued resistance, for example, producing a small voltage, the signal in this invention at the output 35 of preamplifier 32 is highly sensitive to the residual current flowing through the transmit coil immediately after the transmit periods when the first element of T/R switch (3 or 4) is switched off, because the value of the damping resistor 34 is much higher in this case, and the residual transmit-coil current produces a relatively large voltage across damping resistor 34, that is then amplified by preamplifier 32. It is this voltage that is sampled or synchronous demodulated and fed to the inputs of loop amplifiers 43 and 47.

Additional voltages may be switched to the transmit coil besides just the two shown in FIG. 1, e.g. +/−170 V, +/−5 V, +/−20 V and 0 V.

Further, the voltages applied to the transmit coil during the transmit periods need not be fixed. For example, the low voltage may vary to maintain a −5 V constant reactive voltage transmit coil voltage which requires the applied voltage to increase, in magnitude, linearly from time 70 to 71 as described in U.S. Pat. No. 7,652,477.

The applied transmit waveform 80, 81, 82, 83, 84, and 85 is similar to that disclosed in U.S. Pat. No. 6,653,838, but this invention offers substantially improved power consumption and ability to commence receive synchronous demodulation during receive periods at an earlier time following the termination of a transmit period.

To gain the benefits of a PI-like transmit waveform, it is best if the high voltage is between 50 V and 500 V and the low voltage is between 3 V and 30 V.

The transmit control, such as the negative feedback loops, synchronous demodulators, timing and pulse width modulators can be implemented in either analogue electronics or DSP or both.

In order to minimise the delays between the cessation of the transmit coil current and the commencement of synchronous demodulation or sampling during the zero-transmit period, it is necessary to minimise the current flowing through the transmit coil at the end of each transmit period by means of a negative feedback loop associated with each zero-transmit period within each fundamental period of the repeating transmit signal cycle, each said zero-transmit period immediately preceded by an associated transmit period, wherein each said negative feedback loop responds to the current through the transmit coil during the said associated zero-transmit period, and each negative feedback loop controls part of the said associated transmit period such that the current through the transmit coil at the commencement of the said associated zero-transmit period is controlled to be approximately zero.

The said receive signal is processed by the receive electronics which includes: a receive coil 50 connected to an input of preamplifier 51 whose output 52 is connected to an input of synchronous demodulators or samplers 53, whose output 55 is connected to processing electronics 56 including at least averaging or low-pass filtering and possibly high-pass or band-pass filtering, and an output 57 of these filters 56 is connected to an input of further processing electronics 58 which may include functions such as discrimination and ground balancing, and an indicator output signal is provided at 59, indicating the presence of at least some electrically conducting target when within the influence of transmit magnetic field.

The synchronous demodulators or samplers 53 are controlled by control signals at 54, generated in a timing electronics 20. The synchronous demodulators 53 and filters 56 may be DSP or analogue or both.

An alternative input to the synchronous demodulators or samplers 53 may be the output 35 of preamplifier 32, and either or both coils 1 or 50 may be used for receiving receive signals.

The synchronous demodulation may be selected to advantage by using the principles disclosed in U.S. Pat. Nos. 5,576,624, 6,636,044, WO 2008/040089, and AU2009243482, for example.

The reason why it is worthwhile using this T/R switch in conjunction with a nulled coil, such as a DD, are the same as the reasons as to why it is worthwhile using these coils with conventional PI, with an added advantage of this invention, that being the rapid recovery of the receive electronics after transmit periods.

Figure 3:
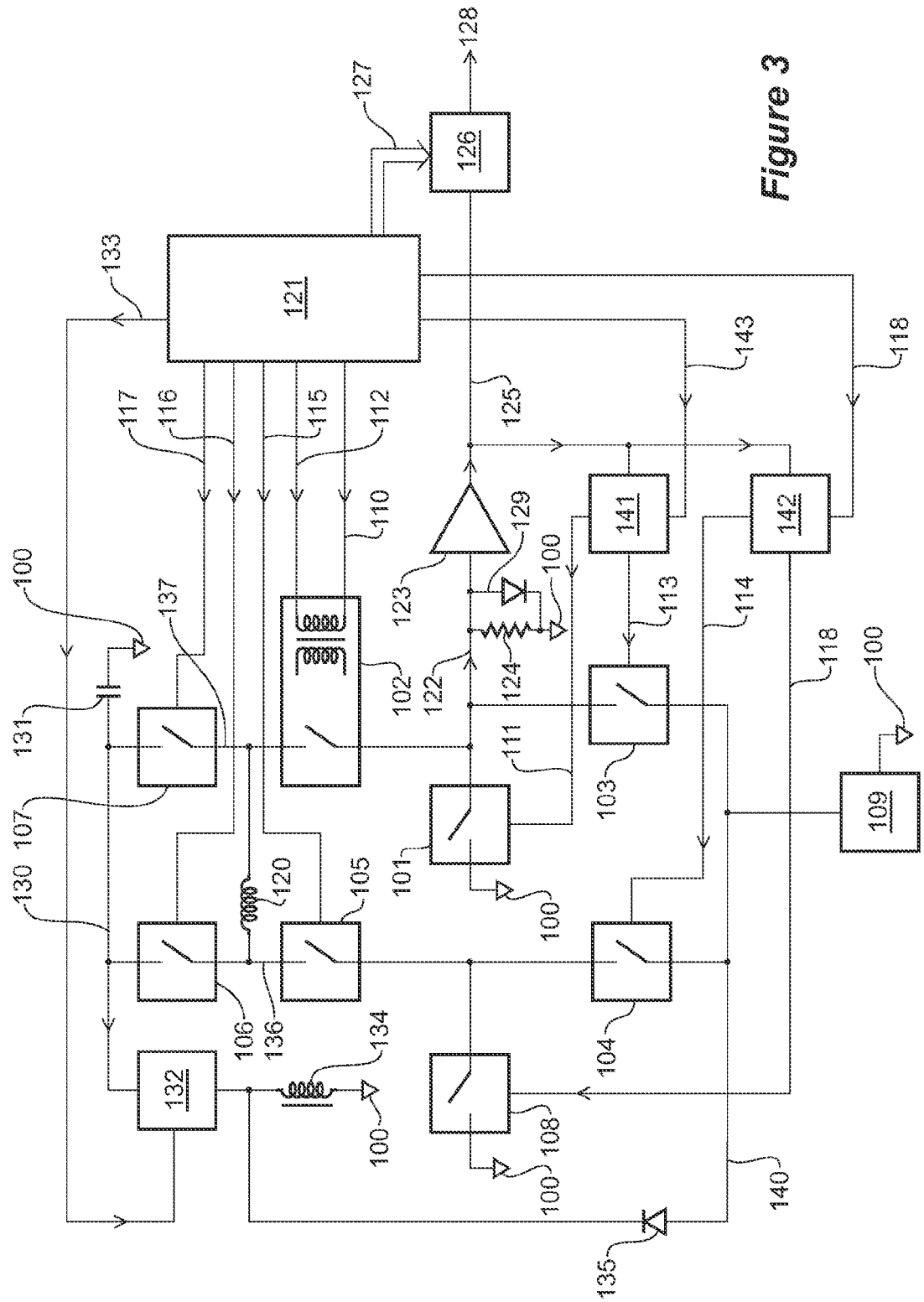
FIG. 3 depicts a block electronic circuit diagram of another embodiment of the invention with an electronic system capable of producing a repeating transmit signal cycle.

Another embodiment is given in FIG. 3. Much of the switching electronics is similar in circuit arrangement to that of FIG. 1, in particular, low-voltage power source 109 and low-voltage power source 6, switches 104 and 7, switches 108 and 9, switches 105 and 8, switches 106 and 11, capacitors 131 and 15, damping resistor 124 and 34, small signal diode 129 and diode 33, preamplifier 123 and 32, the same functions in block 126 and synchronous demodulators or samplers 53 plus filters 56 plus further processing electronics 58, timing electronics 121 and 20. A first element, a switch 101 plays the similar role as the T/R switch 3 or 4 or 5, also referred to as a first element in FIG. 1, but the T/R switch in FIG. 3 also includes a second element 102, a switch whose control circuitry input is galvanically isolated from the rest of the electronics, at least during zero-transmit periods.

Figure 4:
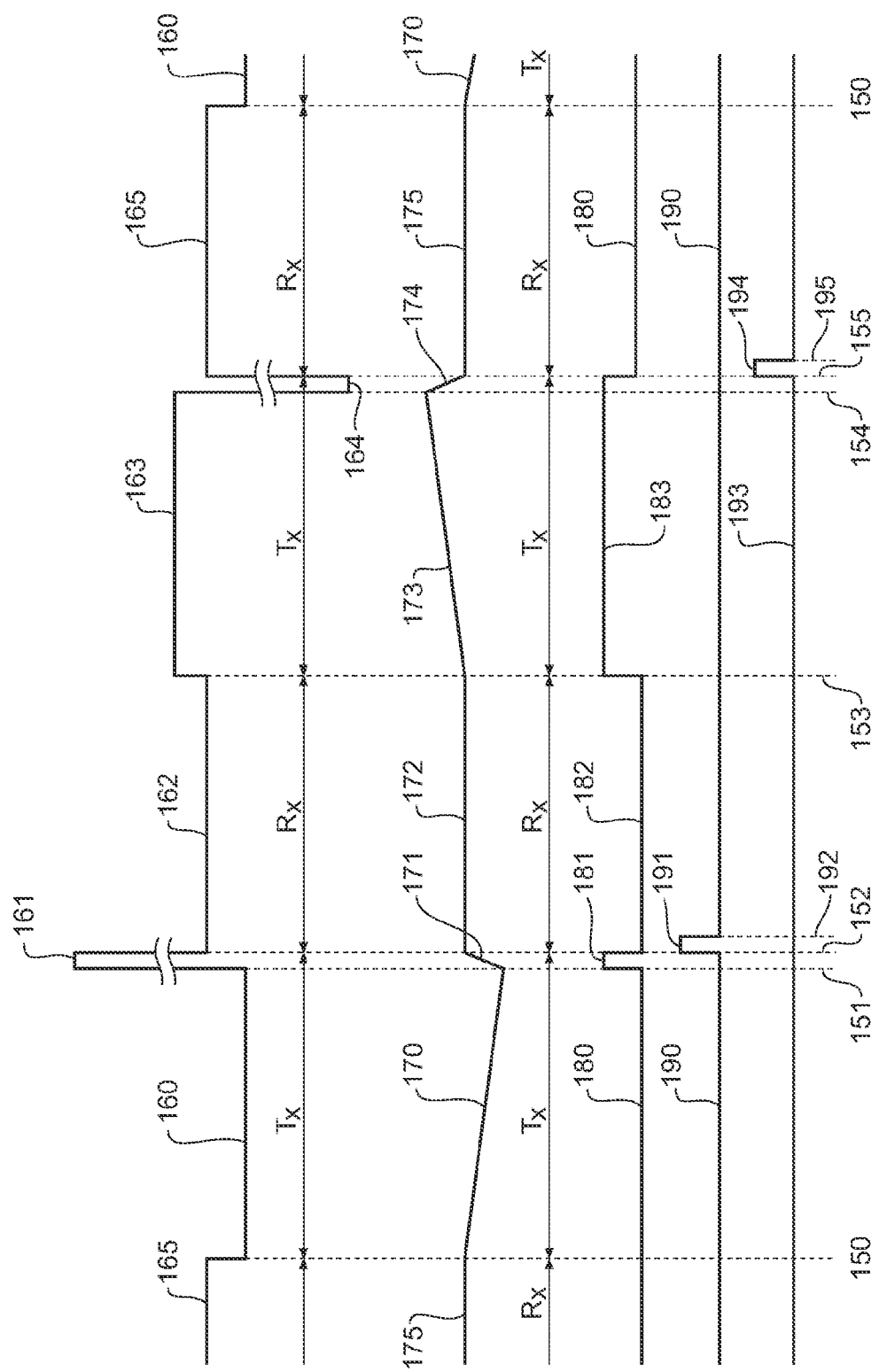
FIG. 4 is an example depicting suitable waveforms for FIG. 3.

With reference to FIG. 4, an example of a possible transmit waveform is a symmetrical bi-polar pulse induction waveform. During a second low-voltage period between times 153 and 154, the second end 136 of the transmit coil 120 is switched to the low voltage 163 of low-voltage power source 109 via switches 105 and 104, while switch 108 and switch 106 are in a switched off state. The first end 137 of the transmit coil 120 is switched to zero volts 100 of the transmit electronics via the second element 102 switch and the first element switch 101, while switch 107 and switch 103 are in a switched off state. At time 154, switch 105 is switched off, and the second end 136 of the transmit coil 120 is switched to the high voltage 164 across capacitor 131 at 130 via switch 106. During the second high-voltage period between times 154 and 155, either the first element switch 101 may be turned on and switch 103 turned off, or vice versa, while the second element switch 102 in a switched on state and switch 107 in a switched off state. At time 155, switch 106 is switched off, and the second end 136 of the transmit coil 120 is switched to zero volts of the transmit electronics 100 via switch 105 and switch 108, while switch 104 is in a switched off state, and the first end 137 of the transmit coil 120 is switched to an input 122 of preamplifier 123 via the second element switch 102, while the first element switch 101 and switch 103 and switch 107 are in a switched off state. During the second zero-transmit period between times 155 and 150, the first end 137 of the transmit coil 120 is loaded by resistor 124, the effective "stray capacitance" is from the switches 103, 101 and 107 and the second element 102 to the rest of the electronic circuit, as well as the PCB, coil cable, transmit coil self-capacitance and so on. At the time of writing, if switches 101, 102, 103, 107 are FETs selected for low capacitance and suitable switched on resistances for peak currents of several amperes, their capacitances presented to the first end 137 of transmit coil 120, with switch 102 in a switched on state, including the contribution from the gate drive circuitries to the rest of the circuit with the second element 102 switched on, and switches 107, 103 and the first element switch 101 switched off, may be:

with zero volts across the first element 101, approximately 100 pF;
with 180 V across switch 107, approximately 30 pF;
with 5 V across switch 103, approximately 50 pF;
with the second element switched on, less than 20 pF to the rest of the circuitry as long as the gate drive circuitry is galvanically isolated from the rest of the circuitry at least during the zero-transmit periods.

Hence the total capacitance presented by the electronics is approximately 200 pF during the zero-transmit periods. For the example given above, this may produce in practice a critically damped time constant at the preamplifier 123 input 122 of approximately 0.6 μs when at typical commercial coil and its connecting cable are connected to the detector.

At time 150, a first low-voltage period between times 150 and 151 commences, when the first end 137 of the transmit coil 120 is switched to a low voltage 160 of the low-voltage power source 109 via the second element switch 102 and switch 103, while switch 107 and switch 101 are in a switched off state. The second end 136 of the transmit coil 120 is switched to zero volts 100 of the transmit electronics via switch 105 and switch 108, while switch 104 and switch 106 are in a switched off state. Relative to the direction in which the coil is connected, the second low-voltage period is of opposite polarity to the first low-voltage period. At time 151, the second element switch 102 is switched off, and the first end 137 of the transmit coil 120 is switched to the high voltage 161 across capacitor 131 at 130 via switch 107. During this first high-voltage period between times 151 and 152, either switch 108 may be turned on and switch 104 turned off, or vice versa, while switch 105 is in a switched on state and switch 106 is in a switched off state. Relative to the coil polarity, the second high-voltage period is of opposite polarity to the first high-voltage period. At time 152, switch 107 is switched to a switched off state, and the second end 136 of the transmit coil 120 is switched to zero volts of the transmit electronics 100 via switch 105 and switch 108, while switch 104 is in a switched off state, and the first end 137 of the transmit coil 120 is switched to an input 122 of preamplifier 123 via the second element switch 102, the first element switch 101 and switch 103 and switch 107 are in a switched off state.

The transmit coil current increases negatively 170 during the first low-voltage period according to a trace approximating $-5/R(1-\exp(-Rt/L))$, the voltage of the low-voltage power source 109 being −5 V, for example. During the first high-voltage period, the transmit coil current decreases rapidly 171 to zero. The transmit coil current is effectively zero 172 during the first zero-transmit period. The transmit coil current increases positively 173 relative to the transmit coil polarity during the second low-voltage period according to a trace approximating $5/R(1-\exp(-Rt/L))$. During the second high-voltage period, the transmit coil current decreases rapidly 174 to zero. The transmit coil current is effectively zero 175 during the second zero-transmit period.

Capacitor 131 is charged up by the coil energy as it discharges into the capacitor during the high-voltage periods. The energy in the capacitor is returned to the low-voltage power source 109 by a switch-mode power supply consisting of the switch-mode power supply electronics 132, its energy storage inductor 134, and rectifying diode 135. This regulates the high voltage, for example to +180 V. The switching of the switch-mode power supply is controlled 133 by timing electronics 121.

As above, in order to ensure minimal transient signals at the commencement of the zero-transmit periods, negative feedback loops may be implemented to monitor the transmit coil current at the beginning of the zero-transmit periods which adjust a voltage(s) or period(s) within the following associated transmit periods. An output 125 of preamplifier 123 is sampled or synchronously demodulated 191 between times 152 and 192 in a first synchronous demodulator (or sampler) plus first negative feedback loop amplifier plus pulse width modulator 141. Outputs 111 and 113 of the said first synchronous demodulator (or sampler) plus first negative feedback loop amplifier plus pulse width modulator 141 controls the time 150 for example, by controlling switch 101 and 103. Similarly, the output 125 of preamplifier 123 is sampled or synchronously demodulated 194 between times 155 and 195 in a second synchronous demodulator (or sampler) plus second negative feedback loop amplifier plus pulse width modulator 142. Outputs 114 and 118 of the said second synchronous demodulator (or sampler) plus second negative feedback loop amplifier plus pulse width modulator 142 controls the time 153 for example, by controlling switch 104 and switch 108.

When control waveform is high (181 and 183), the first element switch 101 is switched on and switch 103 is switched off; and when the control waveform is low (180 and 182), switch 101 is switched off.

A transmit period may include a period(s) of zero voltage applied across the transmit coil whilst non-zero transmit coil current may be flowing, when for example the switches 108, 105, 102, and 101 may be switched on and switches 106, 104, 107 and 103 switched off, or any other switch combination that will short out both ends of the transmit coil.

In an embodiment, the first element 101 may be connected to a power source of a voltage output different to 0 V, for example, the first element 101 may be switched to −5 V when on, and switch 103 omitted with switch 104 switching to for example to a −10 V power source, instead of −5 V. This means that for this arrangement the low-voltage periods may include +5 V or −5 V switched across the transmit coil, and with zero volts switched to the second end 136 of the transmit coil 120 during the zero-transmit periods, with the capacitance of switch 103 absent, and with the capacitance of the first element 101 being lower with 5 V across the first element instead of zero. Another alternative is with yet other voltages switched to the transmit coil.

Yet further, in another embodiment, switches 105, 106, 108, and 104 are omitted with the second end 136 of the transmit coil 120 connected to the zero voltage of the transmit electronics, and with the first element switch 101 connected to the low-voltage power source 109 instead of the zero voltage of the transmit electronics, and switch 103 omitted. This will allow, for example, PI-like transmit waveforms, or the transmit voltage waveform of FIG. 2.

As above, for the receive electronics, there are some advantages in using a nulled receive coil to receive the receive magnetic field, instead of the transmit coil as shown in FIG. 3. Either an amplified output from a nulled receive coil, or an output 125 of preamplifier 123, or both, may be fed to one or more inputs of receive synchronous demodulators or samplers, plus filters, plus further signal processing 126 whose output 128 produces an indicator signal indicating the presence of at least some metal when within the influence of the transmit magnetic field.

The receive synchronous demodulators or samplers are controlled 127 by the timing electronics 121, as too are the switches 106 via control at 116, 105 via control at 115, 107 via control at 117, the second element via controls at 110 and 112, and the a first and second synchronous demodulators (or sampler) plus negative feedback loop amplifiers plus pulse width modulators 141 and 142 via controls at 143 and 118 respectively.

Figure 5:
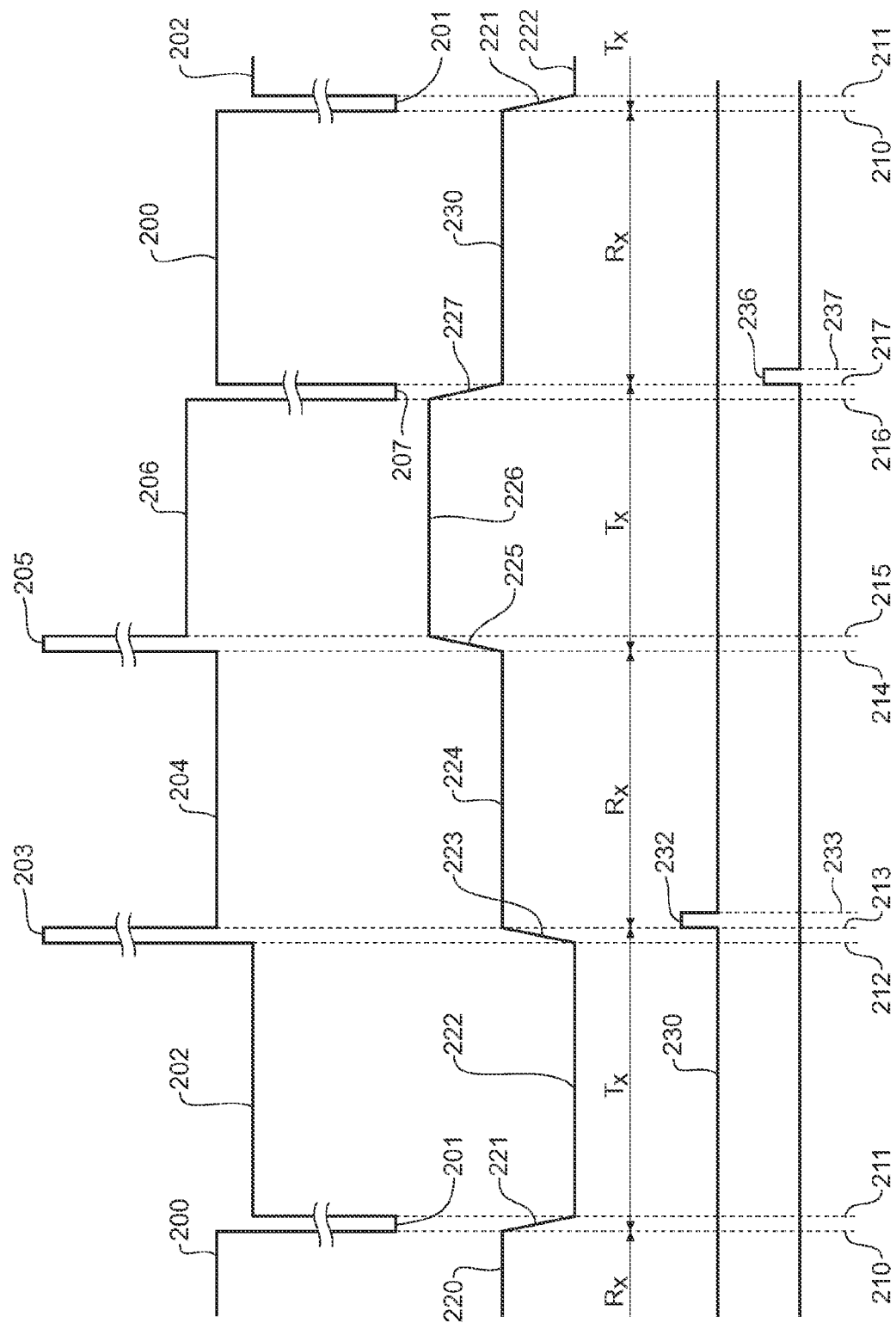
FIG. 5 is another example depicting suitable waveforms for FIG. 3.

Another alternative waveform suitable for FIG. 3 is given in FIG. 5. This produces approximately constant currents 222 and 226 during the low-voltage periods between times 211 and 212, and 215 and 216 when low-voltages 202 and 206 applied, with rapid transmit coil current transitions 221, 223, 225 and 227 between zero and the said roughly constant currents at the times between 210 and 211, between 212 and 213, between 214 and 215, between 216 and 217, respectively, during the high-voltage periods when high voltages 201, 203, 205 and 207 are applied respectively. The first negative feedback loop synchronously demodulates or samples in window 232 between times 213 and 233 to control for example, time 212 in order to minimise the current through the transmit coil at the commencement of the zero-transmit period at time 213, and a second negative feedback loop synchronously demodulates or samples 236 between times 217 and 237 to control for example, time 216 in order to minimise the current through the transmit coil at the commencement of the receive zero-transmit period at time 217. For this waveform, a third negative feedback loop is required either to regulate the high voltage by controlling the current through the transmit coil charging and discharging of capacitor 131 or, within a switch-mode power supply 132, to discharge or alternatively, charge capacitor 131, depending on the exact transmit coil waveform. For the FIG. 5 waveforms for example, if the total effective transmit coil series resistance plus electronics output resistance is e.g. 0.6Ω at least during the low-voltage periods, and the peak current through the transmit (222 and 226) is e.g. 2 A, then the output voltage of low-voltage power source 109 is −1.2 V.

In all of the above examples, the first element is switched to a switched on state for at least a part of the transmit period during which effectively all, or at least 95% of the transmit coil current flows through the first element at least when the transmit coil current is at a maximum during the periods when the first element is switched on. Similarly, in all the above examples, the second element is switched on for at least some of the transmit period during which effectively all, or at least 95% of the transmit coil current flows through the second element at least when the transmit coil current is at a maximum during the periods when the first element is switched on.

Further, for reasonably high power efficiency at the time of writing, and for similar currents and voltages given in the examples herein, it is best if the absolute value of maximum voltage drop across the T/R switch (the first element in FIG. 1 and the first plus the second element in FIG. 3 plus control circuitry) is less than, for example, 1.5 Volt when the transmit coil current is at a maximum during the repeating transmit signal cycle and the first element is in a switched on state for FIG. 1, and both the first and second elements are in a switched on state for FIG. 3. Lower capacitance devices with lower on resistances might become available in the future.

Suppose that the effective series resistance of the transmit coil is 0.3Ω, for example. The low-voltage power source 6 (or 109) and high-voltage power source 14 (or 131) have low effective series output resistances, (may be reactive in impedance, e.g. capacitor 15 or 131), and the resistances of the transmit electronics switching electronics switches in a switched on state are low; their cumulative resistance constitutes the output effective series resistance of the transmit electronics. If the output effective series resistance of the transmit electronics connected to the transmit coil 1 (or 120) is of relatively low impedance, e.g. 0.2Ω, relatively little energy is dissipated in the transmit electronics. However, were the output effective series resistance of the transmit electronics for example, double the effective series resistance of the transmit coil, at 3 A peak transmit coil current, 2 times 0.3Ω will produce a voltage drop of approximately 1.8 V. This is fairly inefficient, and hence in order to preserve power efficiency in this embodiment, it is best if the output effective series resistance of the transmit electronics is less than two times the effective series resistance of the transmit coil, at least for the low-voltage periods. As the high-voltage periods are so much shorter than the low-voltage periods, this recommended constraint may be relaxed in an alternative embodiment. Similarly, in another embodiment, any effective series dynamic resistance of any element of the transmit electronics through which the transmit coil current flows, at least during the low-voltage periods, such as for example, the T/R switch, when controlled to be in a switched on state, is significantly less than double the effective series resistance of the transmit coil, so that the total output effective series resistance of the transmit electronics is less than two times the effective series resistance of the transmit coil.

At the time of writing, either opto-couplers or magnetic "digital isolators" such as Agilent HCPL-9000, Analogue Devices AduM1100BR, or NVE IL710 may be used to isolate galvanically the gate drive circuitry for the second element 102 switching FET whilst presenting just a few pF stray capacitance to the rest of the circuit, assuming a low capacitance diode is used to charge the gate drive circuitry power supply, the said diode being in a switched off state during the zero-transmit periods.

Figure 6:
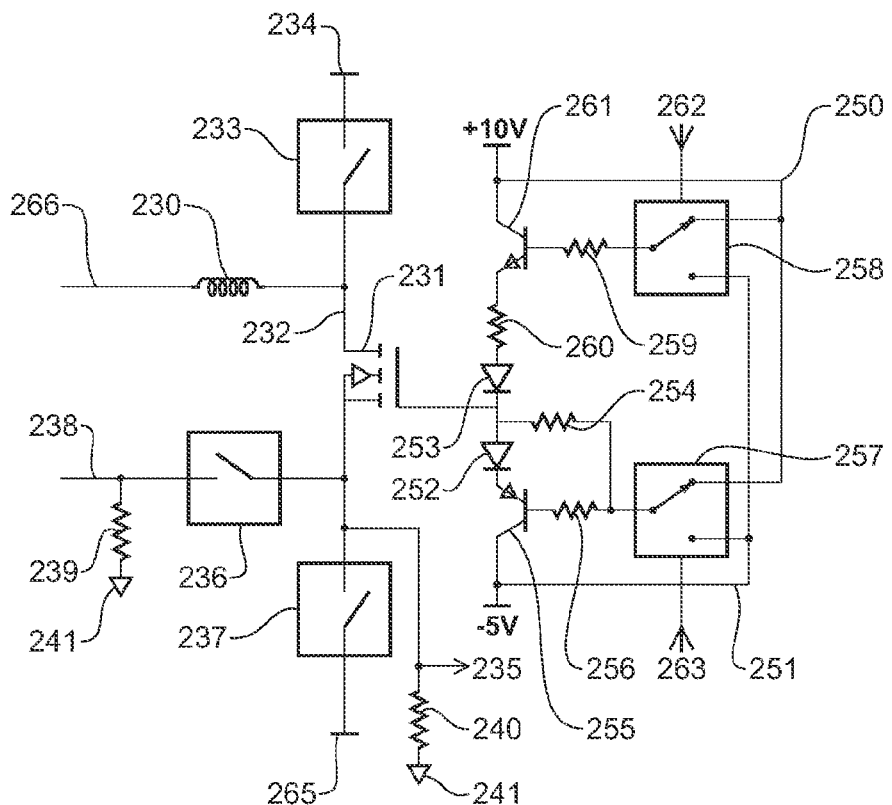
FIG. 6 depicts a block electronic circuit diagram of another embodiment of the invention.

An alternative galvanically isolated circuit driving the gate of the second element FET 231 is given in FIG. 6. FIG. 6 shows mainly the drive circuitry for the second element of the T/R switch. Elements not shown in FIG. 6 can be found in FIG. 3. The isolation occurs through low capacitance "small signal" diodes 252 and 253 being reversed biased during the receive periods, and the gate voltage maintained by a resistor 254 of relatively very high value and the capacitance of the gate of the second element FET 231. The source of the second element FET 231 is connected to the first element switch 236 and a to switch 237, switch 237 being connected to a low voltage at 265. The first element switch 236 is connected to a small-valued transmit coil current sensing resistor 239 which is connected to the electronics earth 241. The transmit coil current may be measured as a proportional voltage at 238. The drain of FET 231 is connected to the first end 232 of the transmit coil 230 and to switch 233, switch 233 being connected to a high voltage at 234. The gate of FET 231 is connected to the diodes 252 and 253, and resistor 254 (e.g. 100Ω). Diode 253 is connected to resistor 260 (e.g. 100Ω) which acts to limit the (positive) charging rate of the gate voltage. This resistor is connected to a "pull up" transistor 261 connected to a positive voltage source at 250 (e.g. +10 V). The base of transistor 261 is connected through resistor 259 (e.g. 470Ω) to switch 258, which either selects the positive voltage at 250 or a negative voltage at 251, e.g. −5 V, or at least greater or equal to the magnitude of the negative voltage at 265. Similarly, diode 252 is connected to a "pull-down" transistor 255 connected to the negative voltage at 251. The base of transistor 255 is connected through resistor 256 (e.g. 470Ω) to switch 257, which either selects the positive voltage at 250 or the negative voltage at 251. The T/R switch output 235 at the source of FET 231 is connected to resistor 240 selected to critically damp the transmit coil when the second element FET 231 is switched on (gate positive), the first element switch 236 is switched off and switches 237 and 233 also switched off, whilst the other end of the transmit coil 230, the second end 266, is switched to the electronics earth 241. Resistor 240 is connected to the electronics earth 241. Switch 257 is also connected through resistor 254 to the gate of FET 231.

Figure 7:
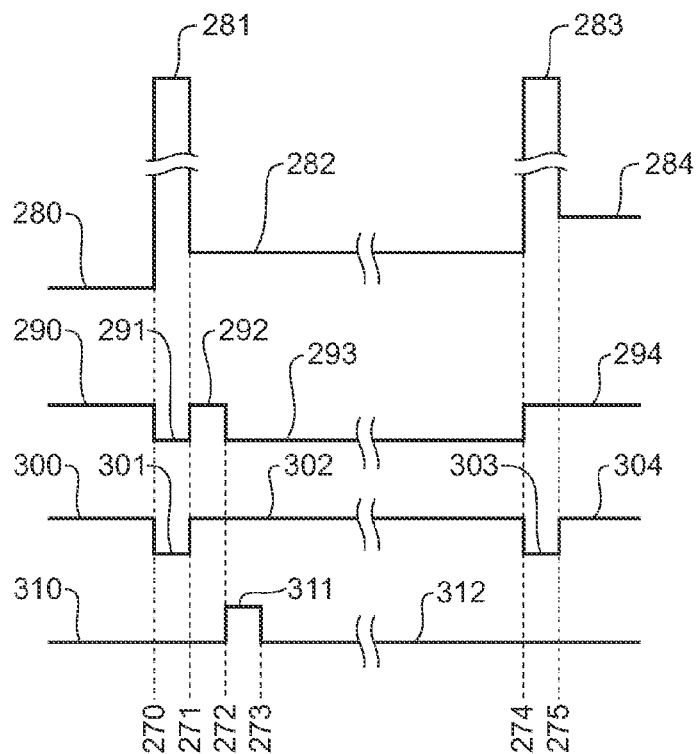
FIG. 7 depicts waveforms associated to one embodiment of the electronic circuit, during operation, depicted in FIG. 6.

FIG. 7 shows waveforms to illustrate the basic control of the gate drive circuitry of FIG. 6. The top waveform shows the voltage applied to the transmit coil 230. The control 262 of switch 258 is shown as the second to top waveform; the positive voltage at 250 is selected when the control 262 is high 290, 292 and 294, and the negative voltage at 251 is selected when the control 262 is low 291 and 293. The control 263 of switch 257 is shown as the third to top waveform; the positive voltage at 250 is selected when the control 263 is high 300, 302 and 304, and the negative voltage at 251 is selected when the control 263 is low 301 and 303. A low negative voltage 280, from the low-voltage source at 265, is switched by switch 237 to the first end 232 of the transmit coil 230 when the second element FET 231 is controlled to be switched on by pull-up transistor 261 switching a positive voltage to the gate of FET 231 when the control 262 of switch 258 is high 290. Between times 270 and 271, the gate of FET 231 is switched low by pull-down transistor 255 applying the negative voltage at 251 when the control 263 of switch 257 is low 301, thus switching the second element FET 231 off. Also between times 270 and 271, switch 233 is in a switched on state, switching the high voltage 281 at 234 to the first end 232 of transmit coil 230. Between times 271 and 272, switch 233 is in a switched off state, the gate of FET 231 is switched high 292 by pull-up transistor 261 applying the positive voltage at 250, thus switching the second element FET 231 on, and the first element switch 236 is in a switched on state. Thus the first end 232 of transmit coil 230 is switched to zero volts 282; at this time, the second end 266 of the transmit coil 230 is switched or connected to zero volts 241. From time 272 to time 274, the pull-up transistor 261 is switched off 293, and the pull-down transistor 255 is switched off 302; thus the gate of FET 231 is held high (via resistor 254 applying the positive voltage at 250, and hence the second element FET 231 is switched on, whilst all the other switches 233, 236 and 237 are switched off. During this period, the first end 232 (switched to 235) of transmit coil 230 is loaded by resistor 240, and the capacitance of switches 233, 236 and 237, and the capacitances of diodes 253 and 252 via the capacitances of transistors 261 and 255 respectively, and resistor 254, via the gate capacitance of FET 231. Resistor 254 may be hundreds to thousands of times higher than that of the critical damping resistor 240, so has virtually no effect on the recovery transients of the T/R switch. Between times 274 and 275, the switch conditions are the same as those between times 270 and 271, and hence the high voltage 283 at 234 is switched to the first end 232 of transmit coil 230. After time 275, switch 233 is in a switched off state, the first element switch 236 is in a switched on state, and the pull-up transistor 261 applies the positive voltage (294) at 250 to the gate of FET 231, thus switching it on. A negative voltage is switched to the second end 266 of transmit coil 230, shown here as a positive voltage 284. Sampling or synchronous demodulation 311 between times 272 and 273 may be used as an input to a negative feedback loop to control the transmit coil waveform prior to time 271 in the following cycle, thereby controlling the mean voltage signal at 235, between times 272 and 273, to be zero, the said mean voltage signal at 235 between times 272 and 273 being proportional to the transmit coil current at the termination of the transmit period immediately preceding time 271, or more precisely, immediately preceding time 272. This control of the mean voltage signal at 235 could be effected by controlling, for example, the time 270.

When the first element is of a relatively high impedance when controlled to be in a switched off state, an effective series dynamic resistance of the first element should be at least say ten times the resistance required to critically damp the transmit coil when connected to the transmit electronics and the T/R switch is switched off. This will ensure that in production, variability in the off resistance of the T/R switches will not unduly affect the transmit coil critical damping.

In one embodiment, the T/R switch configuration is applied to a metal detection system transmitting a repeating transmit signal cycle, which includes a period of zero reactive voltage across the magnetic field transmitter of the metal detector.

Figure 8:
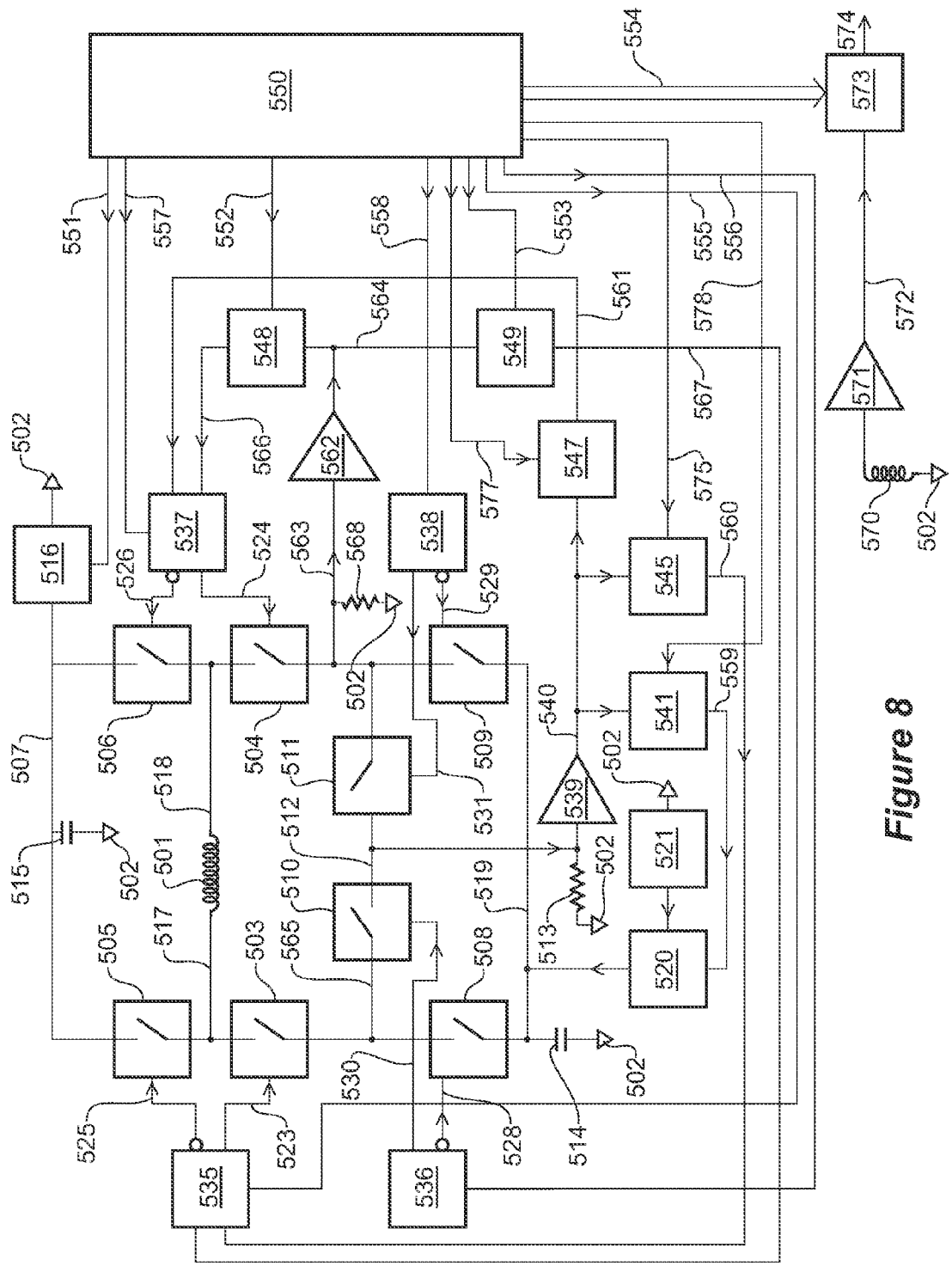
FIG. 8 depicts a block electronic circuit diagram of a system capable of producing a repeating transmit signal cycle suitable for one or more embodiments of this invention.

With reference to FIG. 8, the receive electronics consists of 570, 571, 572, 573, 554 and 574; all other elements being the transmit electronics and timing electronics 550.

A second end 517 of transmit coil 501 is connected to switch 505 and switch 503. Switch 508 and switch 509 are connected to an output of a low-voltage power source 521 (e.g. −2 V) via a linear regulator 520. One end of capacitor 514 is connected to the switches 508 and 509 and an output of the linear regulator 520; its other end is connected to the electronics general zero voltage 502. Capacitor 514 acts to smooth the voltage signal applied to it. The output 507 of a high-voltage power source 516 (e.g. +170 V) is connected to switch 505 and switch 506. Capacitor 515 is connected between the output 507 of the high-voltage power source 516 and zero voltage 502. Switch 503 is connected to switch 508 and switch 510. Switch 510 is connected to the electronics zero volts 502 via a small-valued resistor 513 (e.g. 0.05Ω) across which a voltage proportional to the transmit coil current may be measured, when either switches 510 and 503 are in a switched on state, or switches 504 and 511 are in a switched on state.

A first end 518 of transmit coil 501 is connected to a second element of a T/R switch 504 that is connected to a first element of the T/R switch 511 and to switch 509. An output 563 of the T/R switch is connected to an input of amplifier 562 and to a resistor 568 whose value is selected for critical damping (e.g. 470Ω) when switch 504 is in a switched on state and switches 506, 509 and 511 are in a switched off state.

The switching electronics of the transmit electronics consists of switches 503, 504, 505, 506, 508, 509, 510 and 511 that are controlled to be in a switched on state or off via timing electronics 550, and pulse width modulators plus negative feedback loop amplifiers 535 and 537 through control signals at 555, 560, 557, and 561. Switch 503 has a control input 523 and switch 505 a control input 525, both controlled by outputs of pulse width modulator plus negative feedback loop amplifiers 535, switch 510 has a control input 530 and switch 508 a control input 528, both controlled by outputs of driver 536, switch 506 has a control input 526 and switch 504 a control input 524 both controlled by outputs of pulse width modulators plus negative feedback loop amplifiers 537, and switch 511 has a control input 531 and switch 509 a control input 529 both controlled by outputs of driver 538, which is controlled by a control signal at 558 from timing electronics 550, and driver 536 is controlled by a control signal at 556 from timing electronics 550.

A signal at an output 564 of amplifier 562 is connected to synchronous demodulators or samplers 548 and 549, which are controlled by control inputs at 552 and 553 respectively from outputs of the timing electronics 550. An output 566 of synchronous demodulators or samplers 548 is connected to an input of pulse width modulators plus negative feedback loop amplifiers 537, and an output 567 of synchronous demodulators or samplers 549 is connected to an input of pulse width modulators plus negative feedback loop amplifiers 535. A first negative feedback loop consists of amplifier 562 plus resistor 568, synchronous demodulators or samplers 548, pulse width modulators plus negative feedback loop amplifiers 537 and the switching electronics, in particular switches 506 and 504. A third negative feedback loop consists of amplifier 562 plus resistor 568, synchronous demodulators or samplers 549, pulse width modulators plus negative feedback loop amplifiers 535 and the switching electronics, in particular switches 505 and 503.

The signal across resistor 513 at 512 is amplified by amplifier 539. An output 540 of amplifier 539 is connected to synchronous demodulators or samplers 545 and 547, and synchronous demodulators or samplers plus loop amplifier 541, which are controlled by inputs at 575, 577 and 578 respectively from outputs of the timing electronics 550. An output 560 of synchronous demodulators or samplers 545 is connected to an input of pulse width modulators plus negative feedback loop amplifiers 535, an output 561 of synchronous demodulators or samplers 547 is connected to an input of pulse width modulators plus negative feedback loop amplifiers 537, and an output 559 of synchronous demodulators or samplers plus loop amplifier 541 is connected to an input of the linear regulator 520. A second negative feedback loop consists of resistor 513, amplifier 539, synchronous demodulators or samplers 547, pulse width modulators plus negative feedback loop amplifiers 537 and the switching electronics, in particular switches 506 and 504. A fourth negative feedback loop consists of resistor 513, amplifier 539, synchronous demodulators or samplers 545, pulse width modulators plus negative feedback loop amplifiers 535 and the switching electronics, in particular switches 505 and 503. A fifth negative feedback loop consists of resistor 513, amplifier 539, synchronous demodulators or samplers plus negative feedback loop amplifier 541, the linear regulator 520, and the switching electronics.

Figure 9:
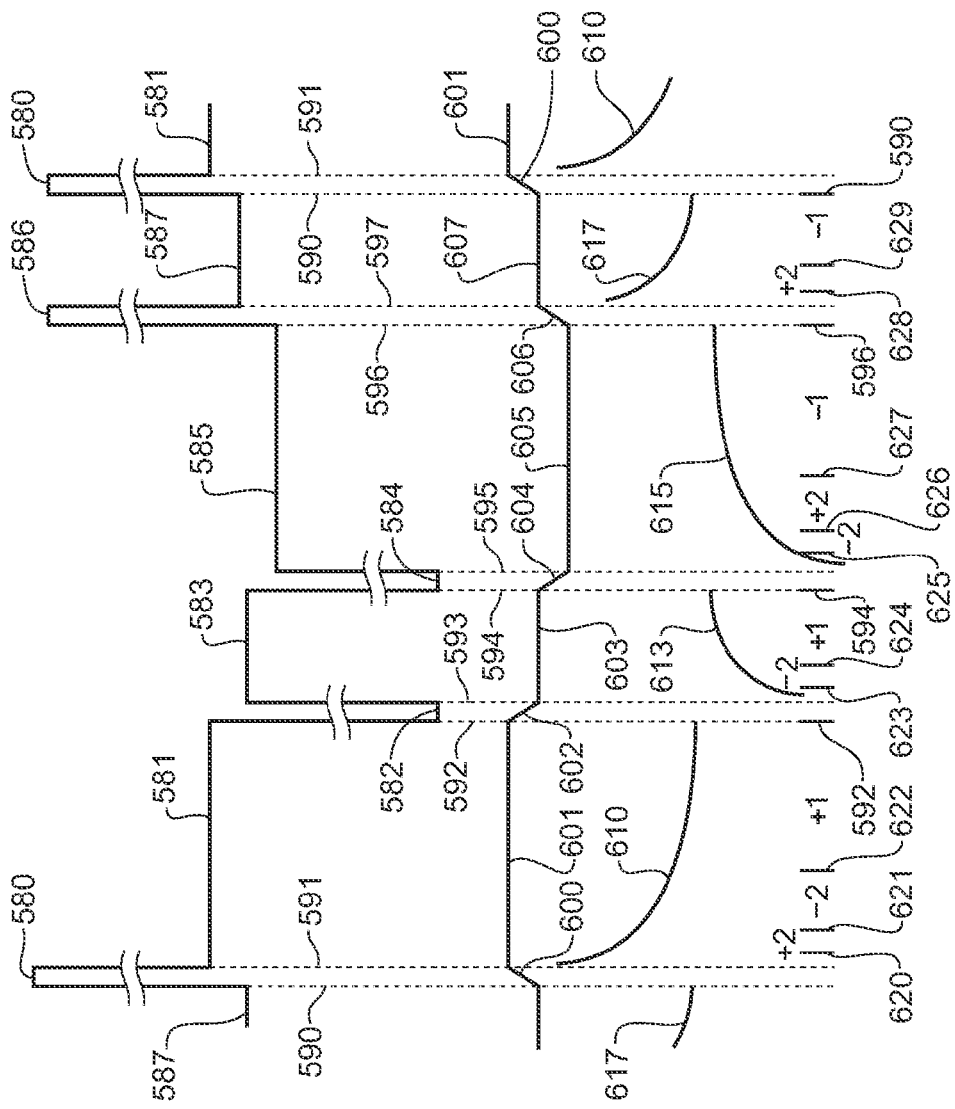
FIG. 9 is an example waveform for one embodiment.

To explain the operation of the circuit, reference is made to an example waveform in FIG. 9. In this figure, the widths of the high-voltage periods are exaggerated and the relative heights reduced for illustrative purposes. The first transmit period consists of;

a. a first high-voltage period of a first polarity (positive) between times 590 and 591 with switches 503, 510 and 506 in a switched on state, switches 504, 505, and 508 in a switched off state, of high voltage 580 e.g. +170 V applied across the transmit coil.

b. The first high-voltage period is immediately followed by an applied low-voltage period with low voltage 581 between times 591 and 592 to produce a first transmit coil approximate zero reactive voltage period with switches 505, 506, 509 and 510 in a switched off state, and the second element switch 504, the first element switch 511 and switches 503 and 508 are in a switched on state (of e.g. −1.5 V across the coil).

c. The second transmit coil approximate zero reactive voltage period is immediately followed by a second high-voltage period of high voltage 582 of an opposite voltage polarity (negative) to the first polarity, between times 592 and 593 with switches 503, 506, and 509 in a switched off state, and the first element switch 511, the second element switch 504, and switch 505 in a switched on state, of e.g. −170 V applied across the transmit coil.

The first zero-transmit period with zero voltage 583 immediately follows the second high-voltage period and is between times 593 and 594 with switches 505, 506, 508, 509 and the first element switch 511 in a switched off state, and the second element switch 504, switch 503 and switch 510 in a switched on state.

Similarly, the first zero-transmit period is followed by a second transmit period consisting of a. A third high-voltage period of high voltage 584 between times 594 and 595 of a polarity opposite to the first polarity.

b. The third high-voltage period is immediately followed by an applied low-voltage period of low voltage 585 between times 595 and 596 to produce a second transmit coil approximate zero reactive voltage period.

c. The said second transmit coil approximate zero reactive voltage is immediately followed by a fourth high-voltage period of high voltage 586 between times 596 and 597 of the same voltage polarity as the first polarity.

The fourth high-voltage period is immediately followed by a second zero-transmit period of zero voltage 587 between times 597 and 590.

During the first high-voltage period, the transmit coil current increases rapidly 600. During the first transmit coil approximate zero reactive voltage period, the transmit coil current is constant 601 (e.g. +3 A). During the second high-voltage period, the transmit coil current decreases rapidly 602 to zero 603. During the first zero-transmit period of zero voltage 583, the transmit coil current remains zero 603. During the third high-voltage period, the transmit coil current increases rapidly negatively 604. During the second transmit coil approximate zero reactive voltage period, the transmit coil current is constant 605 (e.g. −3 A). During the fourth high-voltage period, the transmit coil current decreases rapidly 606 to zero 607. During the second zero-transmit period, the transmit coil current remains zero 607.

The first element of T/R switch 511 acts to switch the first end 518 of the transmit coil 501 to the zero voltage of the electronics 502 via resistor 513 when switched on, or present an open circuit when switched off. A second element, switch 504, acts to switch the first end 518 of the transmit coil 501 to the input of amplifier 562 when switched on, or to isolate the input to amplifier 562 from the first end 518 of the transmit coil 501 when switch 506 is switched to a high voltage at 507 during the first and fourth high-voltage periods. The control electronics of the second element, switch 504, is galvanically isolated and presents low stray capacitance to node 563 being from the capacitance of switches 506, 511 and 509, the transmit coil 501 "self-capacitance" and the cable feeding the transmit coil (at node 518 to node 517), and most of the resistive load is from resistor 568 whose value is selected to critically damp the transmit coil circuit (e.g. 470Ω with a commercial 300 μH 0.3Ω coil and low capacitance, low on resistance FET switches). During a zero-transmit period the second end 517 of the transmit coil 501 is switched to the electronics general earth 502. The signal at the output 563 of the T/R switch 563 is thus highly dependent on the transmit coil current when the T/R switch switches from the transmitting state (switch 504 in a switched on state plus either switch 511 or 509, or 506 in a switched on state and switch 504 in an off state) to the receive state (switch 504, 503 and 510 on plus all other switches in the transmitting switching electronics off.) For example, the peak transmit coil current during transmission may be say 3 A, and if this is reduced to only 0.01% of the peak transmit coil current when the T/R switch switches from transmit to receive, the voltage across resistor 568 (say 470Ω) is approx 150 mV which then decays at with a time constant of 300 μH/470Ω=0.6 μs. This signal in the transmit coil receive electronics (amplifier 562 and associated circuitry), connected to the T/R switch, is amplified by e.g. 30 times in amplifier 562 and will produce an amplified signal of approximately 4.5 V, assuming no overload. This signal is synchronous demodulated or sampled as, or very soon after, the T/R switch switches from transmit to receive; those transitions predicate the use of parts of the zero-transmit periods as inputs to the first negative feedback loop and to the third negative feedback loop. The first and third negative feedback loops control the transmit coil current to be close to zero at the commencement of the first and the second zero-transmit periods (at or just after times 593 and 597). The first negative feedback loop controls a first control of the transmit electronics e.g. an input of a pulse width modulator within the pulse width modulators plus negative feedback loop amplifiers 537 to control the time 592, and the third negative feedback loop controls a second control of the transmit electronics e.g. controlling time 596. Similarly for other negative feedback loops associated with any other zero-transmit periods. The impedance of the first element of the T/R when in a switched off state during at least part of the first zero-transmit period, e.g. >1 MΩ and say 100 pF, is considerable higher than an impedance of the first element of the T/R switch when in a switched on state, e.g. tens of mΩ.

As described in U.S. Pat. No. 7,474,102, WO 2009/155648, WO 2008/006178 and AU2010902666, the transmitter shown in FIG. 8 is far more power efficient that PI technology even with the efficiency features disclosed in U.S. Pat. No. 6,686,742.

The negative feedback loops for the control of the periods of zero reactive voltage across the transmit coil may be similar to those disclosed in WO 2008/006178 and WO 2009/155668. WO 2008/006178 describes a fixed transmit coil reactive voltage throughout the fundamental period with the transmit coil current being modulated by the soil magnetic permeability during receive periods of zero transmit coil reactive voltage, whilst WO 2009/155668 describes a transmit coil reactive voltage which is controlled also to have receive periods of zero transmit coil reactive voltage, but at a fixed constant current, with the high-voltage periods being modulated by the soil magnetic permeability, unlike WO 2008/006178 for which these periods are fixed. Either way, the input to the negative feedback loops controlling the periods of zero reactive voltage across the transmit coil is at the output 540 of amplifier 539. For the WO 2008/006178 system, the first and third high-voltage periods are fixed, and the low voltage varied at 519 via control of linear regulator 520 through two negative feedback control loops within the synchronous demodulators or samplers plus loop amplifier 541, one for each zero transmit coil reactive voltage period. For the WO 2009/155668 system, the low voltage at 519 is controlled by the fifth negative feedback loop to maintain a mean constant current during the zero transmit coil reactive voltage periods. The periods of zero reactive voltage across the transmit coil described herein may be either similar to WO 2008/006178 or WO 2009/155668, but only the system similar to WO 2009/155668 is shown in FIG. 8. The fourth negative feedback loop controls time 594 to ensure the first zero transmit coil reactive voltage period is maintained to be zero (to produce a constant current 605), and the second negative feedback loop controls time 590 to ensure the second zero transmit coil reactive voltage period is maintained to be zero (to produce a constant current 601).

A receive signal from a magnetic field receiver, in this embodiment a receive coil 570, is applied to an input of receive electronics, in this case an input of amplifier 571 whose output 572 is connected to an input of further signal processing electronics 573 that includes synchronous demodulators or samplers. The synchronous demodulator multiplication functions 554 are provided by the timing electronics 550. Within signal processing electronics 573, output of the synchronous demodulators is fed to averaging or low-pass filtering and possibly high-pass or band-pass filtering, and an output of these filters is further processed e.g. using functions such as discrimination and ground balancing. The synchronous demodulator multiplication functions are non-zero at least during the first period of approximate zero reactive voltage across the transmit coil, and may also be non-zero during the second period of approximate zero reactive voltage across the transmit coil, to produce an indicator signal at 574 indicating the presence of at least some metal when within the influence of the transmit magnetic field.

The synchronous demodulator multiplication functions are may be selected to advantage by using the principles disclosed in U.S. Pat. Nos. 5,576,624, 6,636,044, and WO 2008/040089.

FIG. 9 shows receive signals 610 and 615 at 572 during the first and second periods of zero reactive voltage across the transmit coil 501, during which voltages 581 and 585 are applied, respectively, and transmit coil receive signals 613 and 617 at 564 during the first and second zero-transmit periods 583 and 587, respectively. An example of a synchronous demodulation multiplication function applied in a synchronous demodulator in the processing electronics 573 described in WO 2008/040089 is shown in FIG. 9. For example, the synchronous demodulation multiplication function during the second zero reactive voltage period between times 625 and 626 is −2 times, between times 626 and 627 is +2 times, between times 627 and 596 is −1 times, and the first zero-transmit period between times 623 and 624 is −2 times, between times 624 and 594 is +1 times, and during the first zero reactive voltage transmit period between times 620 and 621 is +2 times, between times 621 and 622 is −2 times, between times 622 and 592 is +1 times, and the second zero-transmit period between times 628 and 629 is +2 times, between times 629 and 590 is −1 times.

Figure 10:
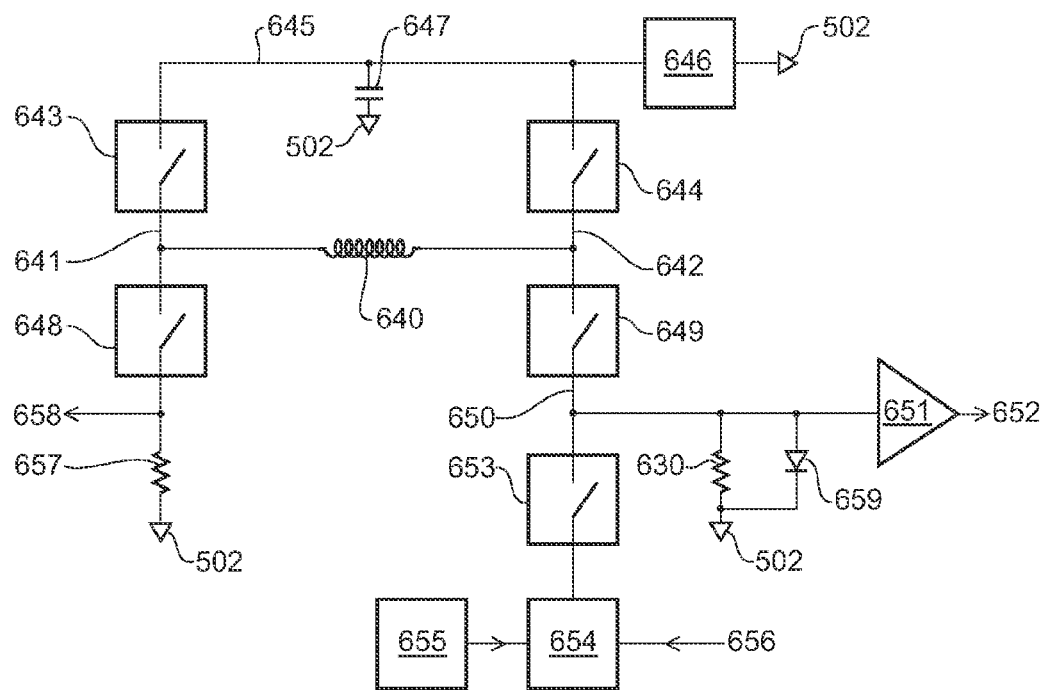
FIG. 10 depicts a simpler block electronic circuit diagram of another system capable of producing a repeating transmit signal cycle suitable for one or more embodiments of this invention.

A simpler embodiment of the transmit electronics block diagram is given in FIG. 10. The roles of the elements are similar to their corresponding elements in FIG. 8. The second end 641 of transmit coil 640 is connected to a hi-side switch 643 connected to a high voltage (e.g. +170 V) at 645, and second end 641 is also connected to a lo-side switch 648 connected to the electronics zero voltage 502, via resistor 657 used for sensing the transmit coil 640 current when the lo-side switch 648 is in a switched on state and switch 643 is in a switched off state. The sensed signal at 658 is fed to a negative feedback loop, described above, to maintain the transmit current to be constant during transmit coil approximate zero reactive voltage periods. The first end 642 of transmit coil 640 is connected to a hi-side switch 644 connected to the high voltage at 645, and first end 642 is also connected to a second element of a T/R switch, a lo-side switch 649 which is connected to a first element, switch 653, and an input of transmit coil receive electronics at 650, namely an input of preamplifier 651. A small signal diode 659 acts to limit the voltage at 650 by shunting any significant positive transmit coil current at 650 to the electronics ground 502. Resistor 630 plays the same role as resistor 568 in FIG. 8.

Low-voltage power source 655 (e.g. −2 V) is connected to a linear regulator 654, controlled by control signal 656. This performs the same role as the linear regulator 520 does in FIG. 8. An output of the linear regulator 654 is connected to switch 653.

The voltage at 645 is maintained by a high-voltage power source 646 across which capacitor 647 is connected.

Figure 11:
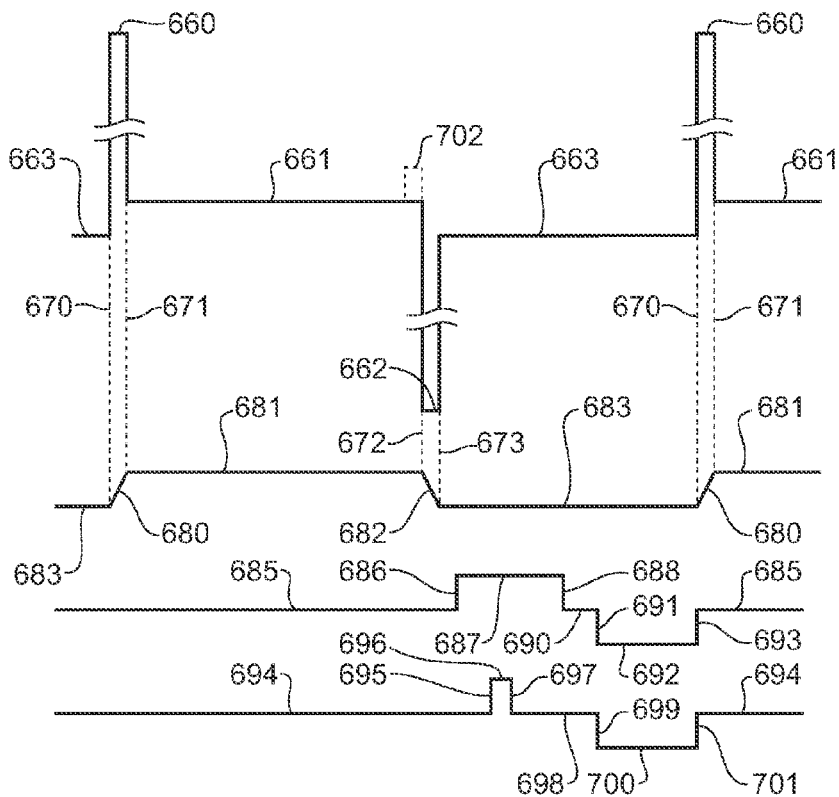
FIG. 11 is an example waveform for one embodiment.

A mono-polar transmit waveform is shown in FIG. 11. When hi-side switch 643, switch 653 and the second element switch 649 are in a switched on state, and switches 644 and 648 in a switched off state, a high voltage 660 is applied across the transmit coil 640 between times 670 and 671 causing a rapid increase in transmit coil 640 current 680. When the lo-side switch 648, switch 653 and the second element switch 649 are in a switched on state, and switches 643 and 644 in a switched off state, a low voltage 661 is applied across the transmit coil 640 between times 671 and 672. This is a period of approximate zero reactive voltage across the transmit coil with the transmit coil current 681 approximately constant during this period. When hi-side switch 644 and lo-side switch 648 are in a switched on state, with switches 643 and 649 in a switched off state, a high voltage 662 is applied across the transmit coil 640 between times 672 and 673 causing a rapid decrease in transmit coil 640 current 682 back to zero 683. When the lo-side switch 648 and the second element switch 649 are in a switched on state, and switches 643, 644 and 653 in a switched off state, a zero-transmit period of zero voltage 663 occurs between times 673 and 670. This is a period of zero transmit coil current 683. An output 652 of preamplifier 651 is used as an input of a negative feedback loop as in FIG. 8 above such that the transmit coil current at the commencement of zero-transmit periods is controlled to be zero.

FIG. 11 shows an example of a suitable soil signal synchronous demodulation multiplication function for processing a VRM soil signal responsive at least to signals from soil with resistive components of the signals substantially independent of frequency, but usually includes a small log-linear component, at least from frequencies within an effective receive bandwidth of receive electronics, not shown in FIG. 11. The resultant demodulated and filtered signal will be responsive to VRM soil components. Between times 686 and 688, the said soil signal synchronous demodulation multiplication function is +1 (687), and between times 691 and 693, the said soil signal synchronous demodulation multiplication function is −1 (692). At other times the soil signal synchronous demodulation multiplication function is zero 685 and 690.

FIG. 11 also shows a synchronous demodulation multiplication function for a first processed signal being more dependent upon a rate of change of environmental static fields detected by the magnetic field receiver than are other signals processed from the receive signal, and the receive electronics subtracts signals proportional to the first processed signal from the said other signals to produce further signals substantially independent of the rate of change of environmental static fields applied to the magnetic receiver. Between times 695 and 697, the said first signal synchronous demodulation multiplication function is +1 (696), and between times 699 and 701, the said first signal synchronous demodulation multiplication function is −1 (700). At other times the first signal synchronous demodulation multiplication function is zero 694 and 698. Further details of the role of this function are disclosed in US2010/0283467. The switching times of this said first processed signal synchronous demodulation multiplication function are selected so that the first processed signal is relatively independent of signals from approximate log-uniform VRM soil with resistive components substantially independent of frequency at least for frequencies within the effective receive bandwidth.

The receive electronics may also process the receive signal during at least part of a transmit period to produce a signal, a second signal, a proportion of the second signal being responsive to a receive signal directly proportional to the effective instantaneous transmit coil reactive voltage, and a proportion of the second signal being responsive to the soil signal. A proportion of the soil signal is subtracted from the second signal to produce a reactive signal, the reactive signal being responsive to receive signals substantially directly proportional to the effective instantaneous transmit coil reactive voltage and being substantially independent of the soil signal. In one embodiment, the synchronous demodulation multiplication function for the second signal is non-zero during and close to the termination of the high-voltage periods, and is zero at all other times.

The receive electronics may also process the receive signal during the approximately zero reactive voltage periods to produce a signal, a third signal, a proportion of the third signal being responsive to a proportion of the reactive signal, and a proportion of the third signal being approximately independent of the soil signal, a proportion of the reactive signal is subtracted from the third signal to produce a reactive balanced signal, the reactive balanced signal being substantially independent of the reactive signal. A proportion of the soil signal is added to the reactive balanced signal to produce a ground balanced signal, such that the ground balanced signal is substantially independent of signals derived from soil with resistive components substantially independent of frequency at least from frequencies of the reciprocal of the fundamental period to more than 100 kHz, which also includes a small log-linear component. Examples of synchronous demodulation multiplication function are given in US20100283467, U.S. Pat. No. 5,576,624 and US2010/0026485, US2010 0019769, US2010 0141247.

An advantage of this system over US2010 0019769, US2010 0141247 is at least that the soil signal and the first processed signal are not contaminated by the reactive signal ("X") due to small electronics inaccuracies. This is because the transmission is zero when these signals are processed, as shown in FIG. 11, owing to the action of the T/R switch. This allows for improved ground balancing accuracy. However, it is not essential that a T/R switch be used; alternatively, the transmit coil may be driven by the transmit electronics low output impedance also during the zero transmit current period. One or more negative feedback loops monitoring the transmit coil current during these zero-transmit periods may control the immediate previous transmit period, in ensuing transmit signal cycles, to ensure that the transmit coil current is zero. This has the advantage of at least controlling the absolute transmit coil current to be zero with zero applied transmit voltage.

Figure 12:
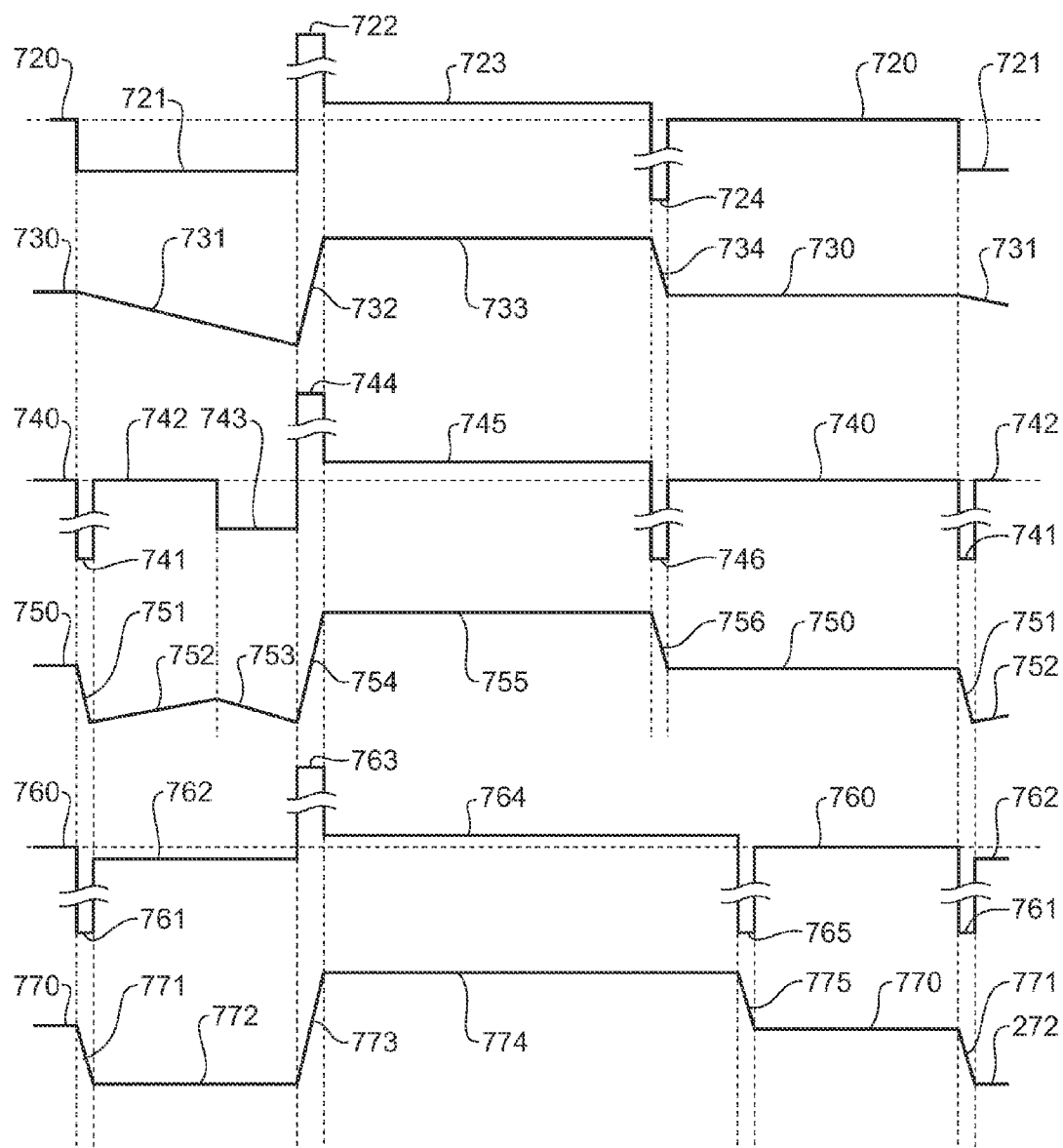
FIG. 12 discloses examples of further transmit signals.

Further examples of useful transmit waveforms are given in FIG. 12. A voltage applied across the transmit coil is at a low negative voltage 721 (e.g. −10 V) during which the transmit coil current 731 increase negatively as −10/R(1−exp(−Rt/L)) where R is the effective series resistance of the transmit coil plus electronics output series resistance, and L is the inductance of the transmit coil. However, it is shown as a linear ramp for simplicity. This may be achieved in FIG. 8 for example, if a −10 V power source is connected to switch 508 instead of linear regulator 520. After this −10 V period, a high voltage 722 is applied (e.g. +170 V) for a period such that the transmit coil current 732 changes from its peak negative value (e.g. −3 A) to a positive current 733 (e.g. +3 A). Following this high-voltage period is an approximately zero reactive voltage period during which the transmit coil current 733 is constant, and a small voltage 723 is applied across the transmit coil (e.g. +1.5 V). Following this approximately zero reactive voltage period 723 is a high-voltage period 724 (e.g. −170 V) when the transmit coil current 734 rapidly returns to zero 730. Following this high-voltage period is a zero-transmit period 720 when the transmit coil current is zero 730.

This waveform has the advantage of being able to synchronously demodulate near the end of the −10 V period to obtain a reactive signal, proportional to the instantaneous transmit coil reactive voltage, that is fairly independent of resistive components, loss related components related to the history of the transmit coil reactive voltage. This improves the quality of the reactive signal and ferrous discrimination.

A system similar to the immediately above waveform is, instead of applying the −10 V for the same −10 V period as above, the period is initiated by a high-voltage period 741 when the transmit coil current increases negatively 751 to negative peak at say −3 A, then a zero voltage 742 is applied across the transmit coil so that it is shorted out, when the transmit coil current decreases in magnitude 752 as −3exp(−Rt/L)). Thereafter, the −10 V may be applied 743 to increase 753 the transmit coil current back to say −3 A. Thereafter, the voltage waveforms 744, 745, 746, 740 applied to the transmit coil are the same as the above-mentioned 722, 723, 724, 720 respectively, as are the transmit coil current waveforms 754, 755, 756, 750 with respect to the above-mentioned 732, 733, 734, 730. This has the advantage of an improved long time constant response during the period of approximate zero reactive voltage 745 compared to that of the period of approximate zero reactive voltage 723.

Yet further to the above, transmit coil applied voltage waveform 760, 761, 762, 763, 764 and 765 produces a current waveform 770, 771, 772, 773, 774 and 775 that is similar to the current waveform 750, 751, 752, 753, 754, 755 and 756 except that it has two transmit coil approximately zero reactive voltage periods when a low voltage 762 is applied across the transmit coil (e.g. −1.5 V) and 764 (e.g. +1.5 V) when the transmit coil current 772 is constant (e.g. −3 A) and 774 (e.g. +3 A), and a shorter zero-transmit period of zero voltage 760 when the transmit coil current 770 is zero. This has the advantage of a different time constant response during the two periods of approximate zero reactive voltage across the transmit coil compared to FIG. 9.

For reasons given in US2010 0141247 and US2010 0019769, the systems described herein are more power-efficient that conventional PI, are able to commence receive synchronous demodulation or sampling at an earlier time following high-voltage periods, and have substantially improved sensitivity to long time constant target signals compared to conventional PI.

Figure 13:
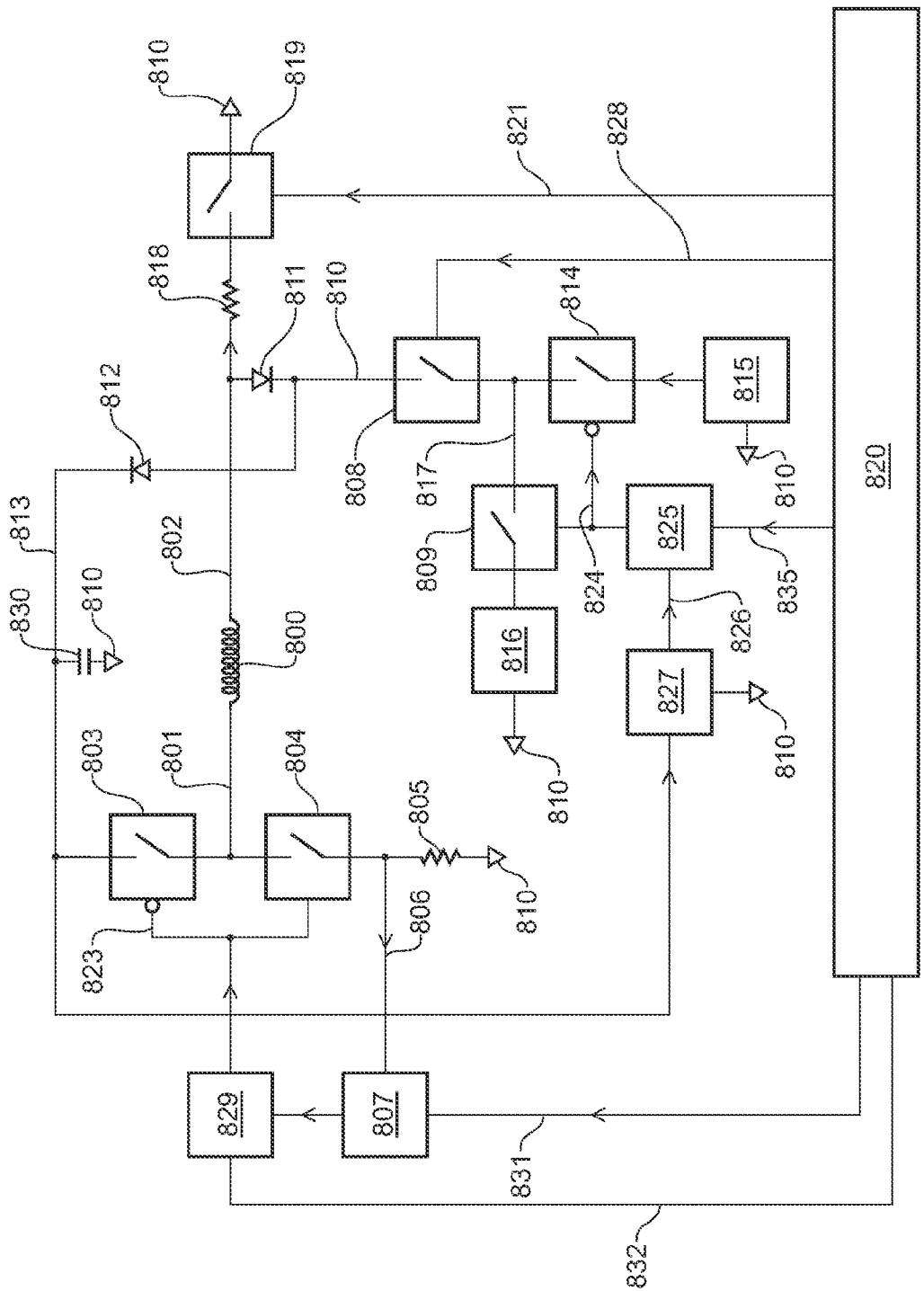
FIG. 13 shows an alternative mono-polar system suitable for producing a repeating transmit signal cycle with at least one zero reactive voltage period.

An alternative mono-polar system suitable for at least one approximately zero transmit coil reactive voltage period is given in FIG. 13, which is similar to FIG. 10, but simpler in operation without an "active" T/R switch, rather, a "diode T/R switch", that may for example, generate the waveform in FIG. 11 with the pulse 702. The second end 801 of transmit coil 800 is connected to a hi-side switch 803 which is connected to a high voltage (e.g. +170V) at 813, and second end 801 is also connected to a lo-side switch 804 which is connected to the electronics zero voltage 810 via resistor 805 (e.g. 0.05Ω) that is used for sensing the current flowing through transmit coil 800 when the lo-side switch 804 is in a switched on state. The sensed signal at 806 is fed to a first negative feedback loop (resistor 805, synchronous demodulator 807, loop amplifier plus pulse width modulator 829, plus switching electronics) to maintain the transmit current to be constant during a first approximately zero transmit coil reactive voltage period. The first end 802 of transmit coil 800 is connected to diode 811 and resistor 818 selected to critically damp the transmit coil during zero-transmit periods. Diode 811 is connected to switch 808 and diode 812, diode 812 acting to clamp the transmit coil back-emf, as switch 808 turns off, to the high voltage at 813.

Switch 808 is connected 817 to switch 809 and switch 814. Low-voltage power source 815 (e.g. −5 V) is connected to switch 814, and low-voltage power source 816 (e.g. −2.5 V) is connected to switch 809.

In FIG. 13, the actions of the diodes are similar to the "T/R switch", in the sense that it guarantees zero transmit coil current during the zero-transmit period, but without a negative feedback loop to control the commencement of the zero-transmit period. As the voltages at both ends of the coil include the high voltage, it cannot be used directly with a mono-loop coil connected to a receive preamplifier.

Alternatively, if low-voltage power source 816 incorporates a linear regulator similar to element 520 in FIG. 8, the first negative feedback loop may control the linear regulator to maintain the first transmit coil approximate zero reactive voltage period instead of controlling a high-voltage pulse width. A second negative feedback loop (loop amplifier 827, pulse width modulator 825, plus switching electronics) maintains the high voltage at 813 to be constant (except for ripple). Its action is illustrated with reference to FIG. 11. Here power source 815 is switched briefly in window 702 to the first end of the transmit coil. The width of this brief pulse, controlled by the second negative feedback loop, increases the transmit coil current at the end of the first transmit coil approximate zero reactive voltage period (time 671 to the commencement of the said brief pulse) such that the energy added compensates the switching losses at the required regulated high voltage.

Capacitor 830 holds the high voltage and its value determines the amount of ripple. In effect, the transmit coil acts as a switch-mode power supply inductive element to supply the high voltage at 813, and hence forms the high-voltage power source.

In order to reduce power losses, the damping resistor 818 is only switched to the electronics zero voltage 810 by switch 819 when or just before the clamping of the back emf to the high voltage by diode 812 ceases (just before time 673), and switch 819 is in a switched on state during the zero-transmit period. Timing electronics 820 supplies the various elements with timing signals via 821, 828, 831, 832 and 835. When diode 811 is in a switched off state (reverse biased or zero voltage biased), it presents only a small capacitive load to the transmit coil. The load is as little as tens of pF, because if switch 808 is a FET, its capacitance approximately stores the back emf voltage, and hence the large reverse voltage across diode 811 during the zero-transmit period is high which causes the capacitance of the diode to be relatively low.

To illustrate the advantages of receiving during a approximately zero transmit coil reactive voltage period, and the zero-transmit periods of FIG. 9, a comparison between the waveforms of FIG. 9 and conventional bipolar transmission follows as defined (for ideal electronics):

A fundamental period of the bi-polar PI transmit waveform has:

a negative linear current ramp peaking at −1 A for a period of 0.5-p of a unit, a first low-voltage period with e.g. −5 V applied across the transmit coil, followed by a first high-voltage period (e.g. +200 V) of duration p, followed by a first zero-transmit period of 0.5 of a unit, followed by a positive linear current ramp peaking at +1 A for a period of 0.5-p of a unit, a second low-voltage period with e.g. +5 V applied across the transmit coil, followed by a second high-voltage period (e.g. −200 V) of duration p, followed by a second zero-transmit period of 0.5 of a unit, whereafter the waveform repeats, the first low-voltage period plus first high-voltage period being a first "transmit period", and the second low-voltage period plus second high-voltage period being a second "transmit period".

This is compared to the waveform in FIG. 9 where:

a first high-voltage period (e.g. +200 V) of duration p is applied across the transmit coil, followed by a first transmit coil approximate zero reactive voltage period (time 591 to 592) of e.g. +1 A of duration 0.5-p of a unit, followed by a second high-voltage period (e.g. −200 V) of duration p, followed by a first zero-transmit period of 0.5-p of a unit, followed by a third high-voltage period (e.g. −200 V) of duration p, followed by a second transmit coil approximate zero reactive voltage period (585) of e.g. −1 A of duration 0.5-p of a unit, followed by a fourth high-voltage period (e.g. +200 V) of duration p, followed by a second zero-transmit period of 0.5-p of a unit, whereafter the waveform repeats, the first high-voltage period plus first approximately zero reactive transmit coil voltage period plus the second high-voltage period being a first "transmit period", and the third high-voltage period plus second approximately zero reactive transmit coil voltage period plus fourth high-voltage period being a second "transmit period".

The table below lists the forms of the emf, induced in the receive coil, from log-uniform VRM (first column) and from uniform conducting half-space (second column). All forms assume a time invariant transmit signal applied to the interrogated log-uniform VRM medium.

The first two rows of equations are the responses due to a transmit cycle from a bi-polar PI detector as defined above. The first row has the responses during the zero transmit periods. The second row has the responses during the positive linear current ramp peaking at 1 A periods.

The third and fourth rows of equations are the responses due to a transmit cycle from an embodiment of this invention, with the waveform as depicted in FIG. 9 and defined above. The third row has the responses during the zero-transmit periods. The second row has the responses during the transmit coil approximate zero reactive voltage periods.

| Rx during | Log-uniform VRM |
| --- | --- |
| Conventional Bipolar PI "off" period | $\frac{1}{p}\ln\left[\frac{\Gamma\frac{t+p}{2}}{\Gamma\frac{t}{2}} \times \frac{\Gamma\frac{t+1}{2}}{\Gamma\frac{t+p+1}{2}}\right] + \frac{1}{0.5-p}\ln\left[\frac{\Gamma\frac{t+p}{2}}{\Gamma\frac{t+0.5}{2}} \times \frac{\Gamma\frac{t+1.5}{2}}{\Gamma\frac{t+p+1}{2}}\right]$ |
| | where $\Gamma$ is the usual Gamma function. |
| Conventional Bi-polar PI "on" period | $\frac{1}{p}\ln\left[\frac{\Gamma\frac{t+0.5}{2}}{\Gamma\frac{t+p+0.5}{2}} \times \frac{\Gamma\frac{t+p+1.5}{2}}{\Gamma\frac{t+1.5}{2}}\right] + \frac{1}{0.5-p}\ln\left[\frac{\Gamma\frac{t+1}{2}}{\Gamma\frac{t}{2}} \times \frac{\Gamma\frac{t+p+1.5}{2}}{\Gamma\frac{t+p+0.5}{2}}\right]$ |
| Zero-transmit period | $\frac{1}{p}\ln\left[\frac{\Gamma\frac{t}{2}}{\Gamma\frac{t+1}{2}} \times \frac{\Gamma\frac{t+1.5}{2}}{\Gamma\frac{t+0.5}{2}} \times \frac{\Gamma\frac{t+p+1}{2}}{\Gamma\frac{t+p}{2}} \times \frac{\Gamma\frac{t+p+0.5}{2}}{\Gamma\frac{t+p+1.5}{2}}\right]$ |

| | |
|---|---|
| Zero reactive voltage period | $\frac{1}{p}\ln\left[\dfrac{\Gamma\frac{t}{2}}{\Gamma\frac{t+1}{2}} \times \dfrac{\Gamma\frac{t+0.5}{2}}{\Gamma\frac{t+1.5}{2}} \times \dfrac{\Gamma\frac{t+p+1}{2}}{\Gamma\frac{t+p}{2}} \times \dfrac{\Gamma\frac{t+p+1.5}{2}}{\Gamma\frac{t+p+0.5}{2}}\right]$ |
| Rx during | Uniform conducting half-space |
| Conventional Bipolar PI "off" period | $\frac{1}{p}[\Phi(-1,1.5,t)-\Phi(-1,1.5,t+p)]+\frac{1}{0.5-p}[\Phi(-1,1.5,t+0.5)-\Phi(-1,1.5,t+p)]$ <br><br>where $\Phi$ is the Lerch function. |
| Conventional Bi-polar PI "on" period | $\frac{1}{p}[\Phi(-1,1.5,t+0.5)-\Phi(-1,1.5,t+p+0.5)]+\frac{1}{0.5-p}[\Phi(-1,1.5,t+1)-\Phi(-1,1.5,t+p+0.5)-t^{-1.5}]$ |
| Zero-transmit period | $\frac{1}{p}[\Phi(-1,1.5,t)-\Phi(-1,1.5,t+p)+\Phi(-1,1.5,t+0.5)-\Phi(-1,1.5,t+p+0.5)]$ |
| Zero reactive voltage period | $\frac{1}{p}[\Phi(-1,1.5,t)-\Phi(-1,1.5,t+p)-\Phi(-1,1.5,t+0.5)+\Phi(-1,1.5,t+p+0.5)]$ |

It is these functions, when multiplied by the "ground balanced" synchronous demodulation multiplication functions, then filtered and processed with other signals, that produce ground balanced signals. The linear combinations with other signals may occur in the synchronous demodulator, then the resultant signals are filtered.

To gain the benefits of a PI-like transmit waveform, it is best if the high voltage is >30 V, and the low voltage is <20 V.

The receive electronics may synchronously demodulate and process the receive signal from the receive coil at least during the approximately zero reactive transmit coil voltage period to produce a first output signal, and also separately synchronously demodulate and process the transmit coil receive signal at least during the zero-transmit period to produce a second output signal. Both the first output signal and the second output signal are processed to produce an indicator signal indicating the presence of at least some metal within the influence of the transmit magnetic field. Because of the large signals applied to the T/R switch during transmit periods, immediately after the start of the zero-transmit period it produces more noise than does the receive coil, so the synchronous demodulation of the receive signal from the transmit coil cannot commence as soon after the termination of a transmit period (which terminates in a high-voltage period in all the above waveform examples) as it can in the case of the receive signal from the nulled receive coil. Furthermore, in order to avoid nulls to certain time constant targets, it is necessary to rely on more than one different signal processing channels, each with a different synchronous demodulation multiplication function as disclosed in U.S. Pat. No. 5,576, 624. Usually, one channel is typically of lower mean sensitivity versus time constant than another channel.

As the synchronous demodulation during transmit periods of approximately zero reactive voltage across the transmit coil can be reasonably performed only upon the receive signal from a receive coil separate from the transmit coil, it may be advantageous if the higher gain channel producing the first output signal is at least demodulated from the receive coil during transmit coil approximate zero reactive voltage periods and the lower-gain channel producing the second output signal is demodulated from the zero-transmit period. As the detection range is intrinsically higher from a mono-loop coil than from a nulled receive coil, advantage may be gained by selecting the lower gain channel producing the second output signal to be derived from demodulation of the transmit coil receive signal only during the zero-transmit period, allowing use of the advantage of the transmit coil acting as a common transmitter and receiver mono-loop and thereby improving the detection range of the lower-gain channel.

Figure 14:
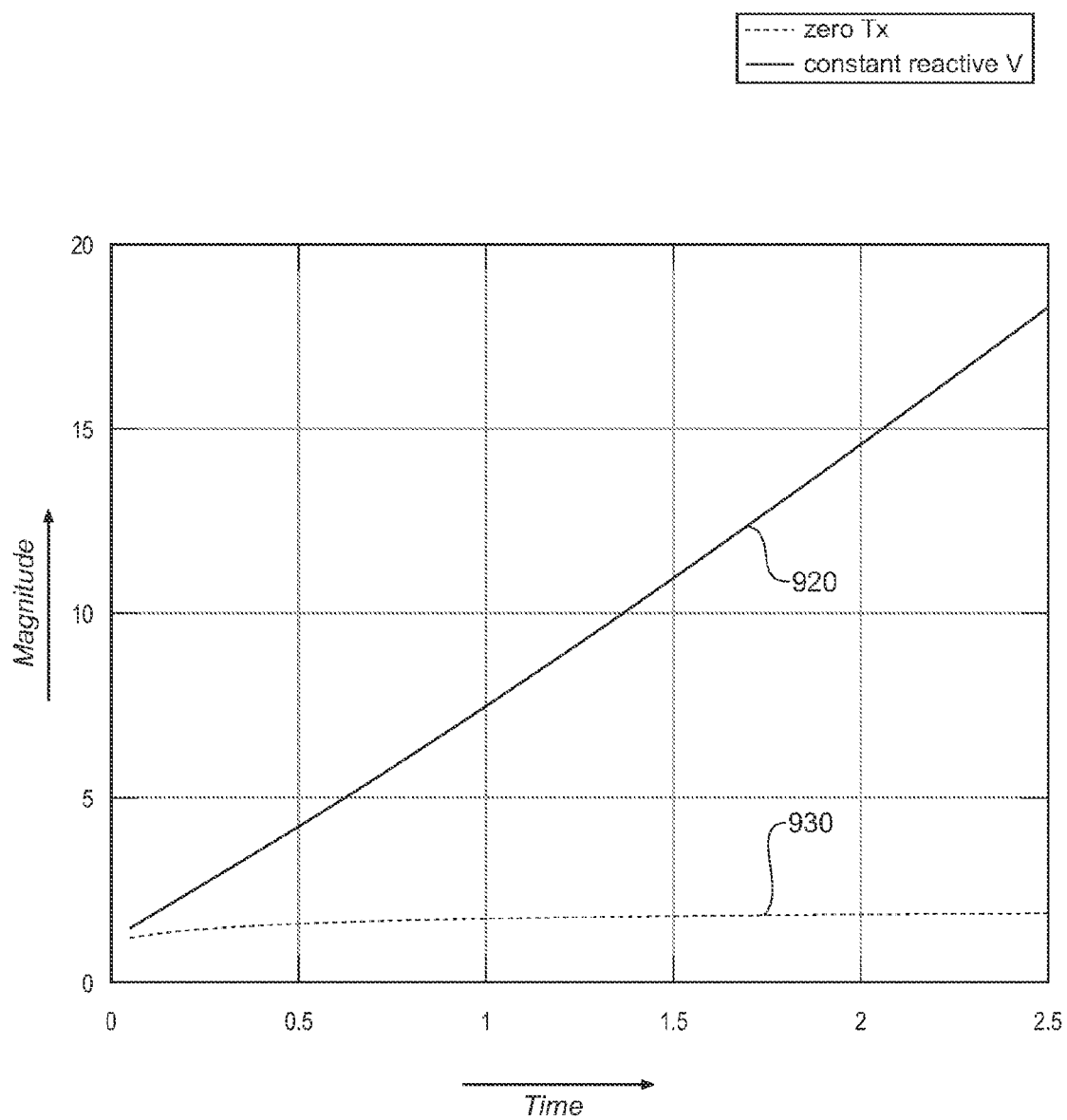
FIG. 14 shows the VRM resistive log-uniform received signal from non-conductive soil for comparisons between different transmit waveforms normalised to the zero transmit bipolar PI transmit receive signal.

FIG. 14 shows the magnitude VRM resistive log-uniform received signal from non-conductive soil (unloaded emf across a receive coil, apart from a critically damping resistor) for the above comparisons between transmit waveforms, normalised to the magnitude of zero transmit bi-polar PI transmit receive signal. The x-axis is elapsed time following a previous high-voltage period; up to 0.5 units from the descriptions above. This graph is from the mathematics in the table above.

The line 920 shows relative sensitivity increasing as time-constant increases during the finite transmit current constant reactive periods, and line 930 shows relative sensitivity increasing as time-constant increases during the zero-transmit periods following the finite transmit current constant reactive voltage periods compared to conventional bipolar PI. That the source of the signal is the same for both the PI sensitivity and the constant reactive voltage sensitivities means that, even though the signals are calculated as responses to VRM, their meaning can be extrapolated to indicate relative sensitivities for conductive time-constants as well. Thus these systems have advantage over conventional PI in the detection of long time constant targets such as large gold nuggets or large UXO (unexploded ordnance). For asymptotically large values of $\tau$, the responses are ~$8\tau$ for the finite transmit current zero reactive voltage period, and ~2times for the zero-transmit periods following the finite transmit current zero reactive voltage period, compared to the response vs $\tau$ of a conventional bipolar PI, where $\tau$ is a first order target time constant.

Figure 15:
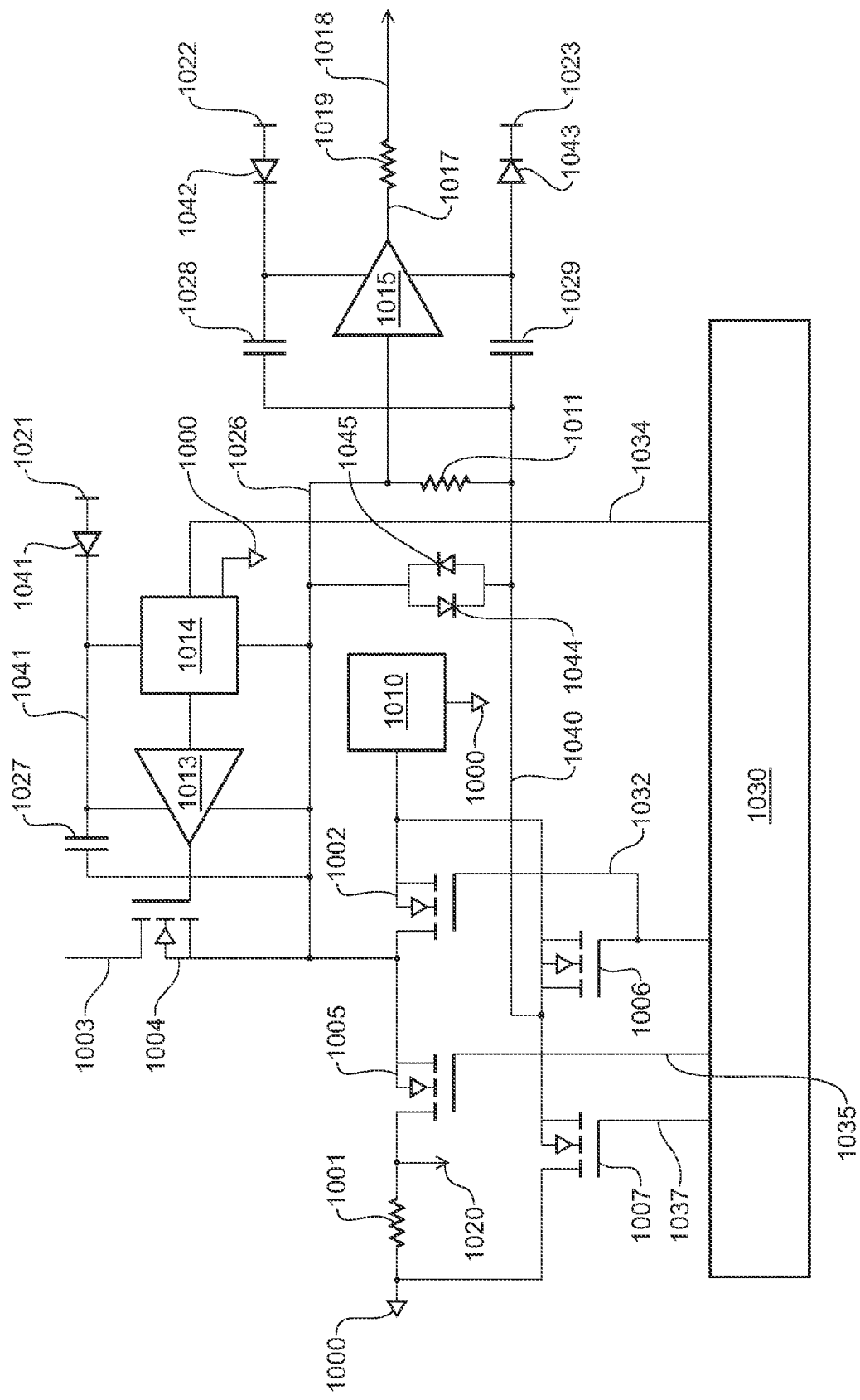
FIG. 15 shows yet another embodiment of the T/R switch.

FIG. 15 shows yet another embodiment of the T/R switch. Connection 1003 connects to the first end of the transmit coil, e.g. or 518 in FIG. 8. The second element 1004, shown in FIG. 15 for example as a FET, is connected to the first element 1005, shown in FIG. 15 for example as a FET. The first element 1005 is connected to the electronics zero voltage 1000 via a low-valued resistor 1001 for sensing the transmit coil current at 1020. A lo-side switch 1002, shown in FIG. 15 for example as a FET, is connected to a power source 1010, with an output voltage of for example −6 V. FET 1007 is connected between the electronics zero voltage 1000 and FET 1006. FET 1006 is connected to the same output of power source 1010 as the lo-side switch 1002, and both lo-side switch 1002 and FET 1006 are switched on and off simultaneously by control line 1032 from timing and control electronics 1030. When FET 1006 is switched on, FET 1007 is switched off and visa versa. When lo-side switch 1002 is switched on, the first element 1005 is switched off. During a zero-transmit period, both the lo-side switch 1002 and the first element 1005 are switched off, or at least for some of the time during receive periods. FET 1007 is controlled by control line 1037. The connection 1040 between FET 1007 and FET 1006 is connected to capacitor 1028, capacitor 1029, damping resistor 1011, small signal diode 1044 and small signal diode 1045. Capacitor 1028 is connected to one supply of preamplifier 1015, and capacitor 1029 is connected to another supply of preamplifier 1015. Capacitor 1028 is connected to a power source output at 1022 via diode 1042, which may simply be the electronics zero voltage 1000, and capacitor 1029 is connected to a power source output at 1023 via diode 1043, which may simply be the electronics zero voltage 1000. The switching voltage at 1040 causes capacitor 1028 and capacitor 1029 to charge via diode 1042 and diode 1043, respectively, and bootstraps the preamplifier 1015, damping resistor 1011 and small signal diode 1044 and small signal diode 1045 to approximately follow the waveform at 1026, which is the input to the preamplifier 1015. An output at 1017 of preamplifier 1015 is connected to a resistor 1019 (or resistors) that is connected to further receiving and processing electronics at 1018. Small signal diode 1045 and small signal diode 1044 are to shunt any residual coil current during the zero-transmit periods to 1040 and thus protect the input of the preamplifier 1015.

A FET gate driver 1013 is connected to the second element 1004, a FET. This is controlled by a galvanically isolated switch (or "relay") 1014. The second element 1004 is connected to a capacitor 1027 at 1026. Capacitor 1027 is connected across the supplies of both the galvanically isolated switch 1014 and FET gate driver 1013 and connected to a voltage (e.g. +5 V) at 1021 of a power source via diode 1041. As node 1026 switches between 0 V (via the first element 1005 switching on), and the voltage at the output of power source 1010 (via lo-side switch 1002), capacitor 1027 charges up. A control line 1034 controls an input of galvanically isolated relay 1014. During the zero-transmit period, diode 1041 is reverse-biased and presents a low capacitance (e.g. of the order of pF) to node 1026.

The table below lists various expected approximate characteristics of different devices suitable for the first element of the T/R switch at the time of writing. For bi-polar transmit coil currents, the T/R switch may consist of an anti-parallel BJTs of opposite polarity connected to zero voltage of the transmit electronics, or anti-parallel diodes, or a single FET.

|  | Capacitance (pF) at 0 V for Bi-polar | Capacitance (pF) at 0 V for mono-polar | Voltage drop at 3 A | Charge injection upon turn-off |
|---|---|---|---|---|
| FET | 100 (one) | 100 (one) | 0.2 | Relatively high |
| BJTs | 200 (one of each polarity) | 100 (one) | 0.35 with $I_{base}$ = 0.03 A | Relatively low |
| Conventional Si diodes | 80 (two) | 40 (one) | 0.9 | none |

The table below lists the delay time in arbitrary units between the termination of the high-voltage period and commencement of synchronous demodulation for a mono-loop coil without preamplifier overload due to residual signals from the high-voltage period for a typical commercial coil; e.g. for a 250 μH inductance, 0.3Ω series resistance, a critical time constant of about 0.5 μs is typical (with coaxial coil cable of suitable length for a hand-held detector).

|  | Critically damped time delay for bi-polar | Critically damped time delay for mono-polar |
|---|---|---|
| Ideal T/R switch (zero capacitance) | 1 unit | 1 |
| FET | 1.2 | 1.2 |
| BJTs | 1.4 | 1.2 |
| Conventional Si diode | 1.2 | 1.1 |

If, when the T/R switch opens, the emf across the coil is 0.5 V, and the eddy current signal contribution from the coil, electronics and PCB are ignored, then the emf for the transmit coil example decays to tens of nano-volts in a bit less than 10 μs. This is reasonable time for the receive synchronous demodulation or sampling of the transmit coil signal to commence without significant interference from the said decaying residual signal. However, if a nulled coil is used for the receiver, the delay time may be substantially reduced. In practice, delays of approximately 5 μs are possible for receive coils of several hundred μH. These delays are roughly half of those typical of well known similar PI systems using conventional small-signal FET T/R switches.

Figure 16:
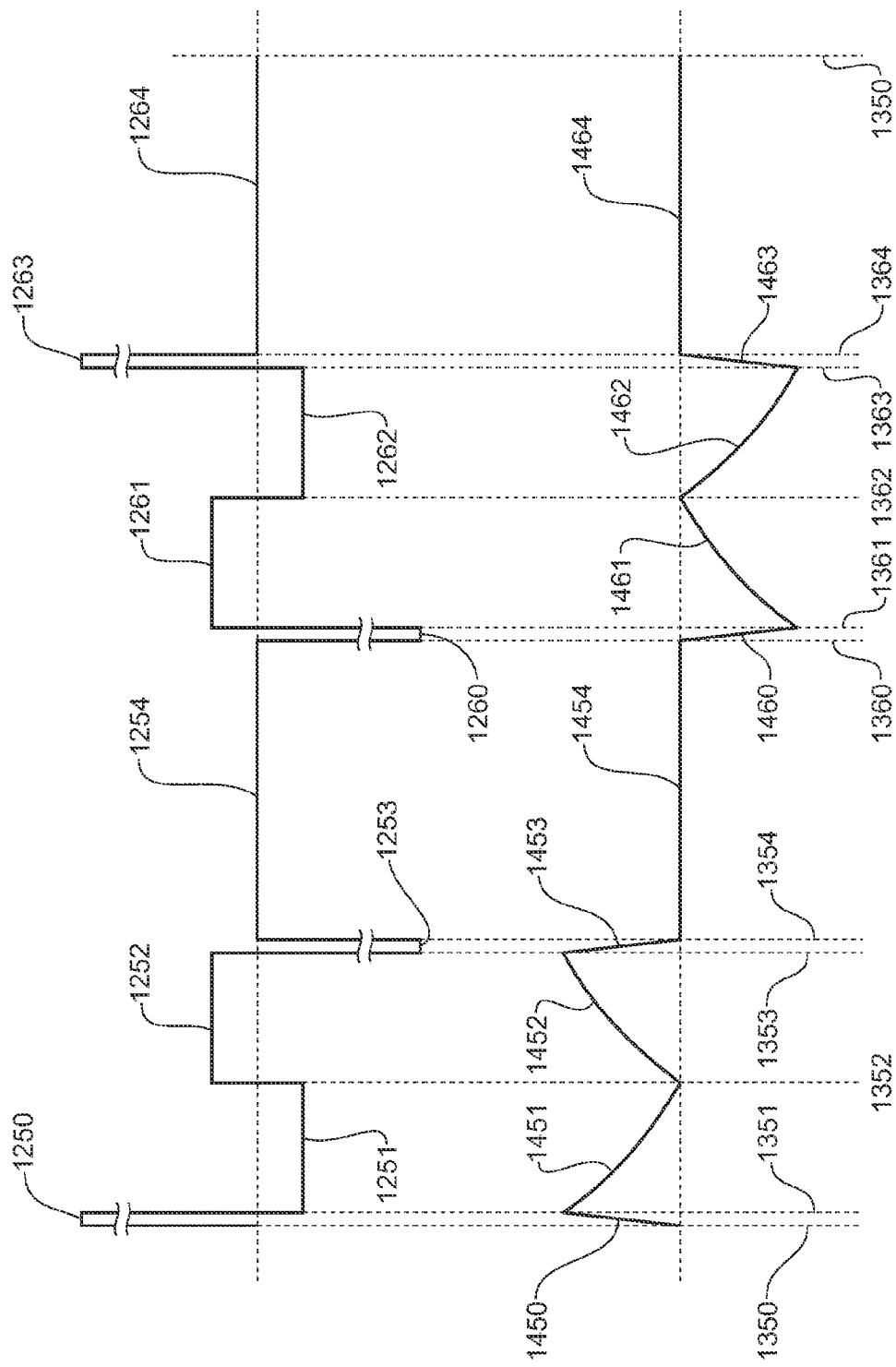
FIG. 16 is another example waveform for one embodiment.

FIG. 16 depicts one embodiment of the repeating transmit signal cycle with a fundamental period defined by repeating time 1350. The top waveform represents the voltage across the transmit coil and the bottom waveform represents the corresponding current flowing through the transmit coil.

The top waveform includes a first sequence and a second sequence. The first sequence includes a first high-voltage period of high voltage 1250 of positive polarity, followed by a first low-voltage period of low voltage 1251 of negative polarity, followed by a second low-voltage period of low voltage 1252 of positive polarity, followed by a second high-voltage period of high voltage 1253 of negative polarity, followed by a first zero-voltage period of zero voltage 1254.

The second sequence following the first sequence is similar to the first sequence except the polarity of waveform is reversed. The second sequence includes a third high-voltage period of high voltage 1260 of negative polarity, followed by a third low-voltage period of low voltage 1261 of positive polarity, followed by a fourth low-voltage period of low voltage 1262 of negative polarity, followed by a fourth high-voltage period of high voltage 1263 of positive polarity, followed by a second zero-voltage period of zero voltage 1264.

During the first high-voltage period between time 1350 and 1351, the current increases positively 1450. During the first low-voltage period between time 1351 and 1352, the low-voltage is selected such that the current decreases 1451. This is different from the case where the low-voltage is selected such that the current is maintained constant during the low-voltage period (see, for example, low-voltage period 581 in FIG. 9 where the low voltage is selected to maintain the corresponding current 601 constant throughout the low-voltage period of low voltage 581).

The duration of the first low-voltage period of voltage 1251 is selected such that the current 1451 decreases to approximately zero at time 1352 before the beginning of second low-voltage period from time 1352 to 1353. During this time, the current increases positively 1452. It is not necessary for the current at time 1353 to reach the level of current that existed at time 1351 before the beginning of the second high-voltage period of high voltage 1253 as shown. As the second high-voltage period of high voltage 1253 is negative in polarity, the current 1453 decreases to zero amperes at time 1354, and at this time, the first zero-transmit period of zero voltage 1254 (or receive period) is from time 1354 to 1360, during which, zero current 1454 flows through the transmit coil.

As the respective polarities of voltages 1260, 1261, 1262, 1263 and 1264 are opposite those of voltages 1250, 1251, 1252, 1253 and 1254 respectively, and the currents 1460, 1461, 1462, 1463 and 1464, defined by time 1360, 1361, 1362, 1363, 1364, and 1350, are of opposite directions to those of the currents 1450, 1451, 1452, 1453 and 1454 respectively. It is possible to have the first sequence and the second sequence different from each other. For example, it is possible to have different durations of the low-voltage periods.

As in the examples above, this waveform may be generated with the advantages of the T/R switch described herein, such that the transmit coil is driven by a low impedance during transmission, and is loaded by a resistor selected to approximately critically damp the transmit coil circuitry during the zero-transmit periods (1254 and 1264). Negative feedback loops may control a parameter of the transmit periods (e.g. a voltage transition time such as 1352, 1362) to ensure that the transit coil current is approximately zero as the zero-transmit periods commence. Further, this waveform has the advantage of not requiring a power source (such as 132 in FIG. 3) to either charge or discharge a voltage across a high-voltage storage capacitor (such as 131 in FIG. 3), as the transmit waveform may be selected to maintain the voltage across the said storage capacitor. A negative feedback loop may control a parameter of the transmit waveform (e.g. a voltage transition time such as 1351, 1361) to maintain the high voltage at a fixed value.

The invention claimed is:

1. A method for detecting an electrically conducting target in soil, including the steps of:
   generating a repeating transmit signal cycle of a fundamental period using transmit electronics, the repeating transmit signal cycle including a first period and a second period within each fundamental period, wherein the first period is a transmit period with finite non-zero current flowing through the magnetic field transmitter;
   generating a transmit magnetic field using a magnetic field transmitter, based on the repeating transmit signal cycle, for transmission into the soil;
   receiving a receive magnetic field using a magnetic field receiver;
   producing a receive signal induced by the receive magnetic field;
   arranging for a current flowing through the magnetic field transmitter to flow to a first potential through a damping resistor during the second period for providing a damping effect on the current flowing through the magnetic field transmitter;
   arranging for the current flowing through the magnetic field transmitter to flow to a second potential, predominantly through an alternative path with a lower resistance than that of the damping resistor, during the first period, in order to short the receive signal to the second potential and to short the receive signal away from both the damping resistor and a preamplifier of receive electronics of the metal detector;
   monitoring the current flowing through the magnetic field transmitter to provide a control signal, the control signal, in effect, causing the second period to begin when the current flowing through the magnetic field transmitter is substantially zero; and
   processing the receive signal during at least part of the repeating transmit signal cycle to produce an indicator signal indicating the presence of an electrically conducting target when the target is within the influence of the transmit magnetic field.

2. A method according to claim 1, wherein the second period is a zero-transmit period with substantially zero current flowing through the magnetic field transmitter.

3. A method according claim 1, wherein the receive signal is processed during at least part of the second period.

4. A method according to claim 1, wherein the magnetic field transmitter and the magnetic field receiver are provided by a single inductive coil.

5. A method according to claim 1, wherein the damping resistor is selected to be of a value required for approximately critical damping of the magnetic field transmitter during at least a part of the second period.

6. A method according to claim 1, wherein the first period includes a zero reactive voltage period with non-zero constant current flowing through the magnetic field transmitter.

7. A method according to claim 6, wherein the receive signal is processed during at least part of the zero reactive voltage period using a second magnetic field receiver.

8. A method according to claim 6, further including the step of:
   sensing the current flowing through the magnetic field transmitter during at least part of the zero reactive voltage period to control part of a characteristic of the repeating transmit signal cycle for maintaining constant the current of the magnetic field transmitter during at least part of the zero reactive voltage period.

9. A method according to claim 8, wherein the part of the characteristic of the repeating transmit signal cycle controlled includes a duration of a non-zero reactive voltage period within the first period.

10. A method according to claim 6, wherein the first period includes at least:
    a first high-voltage period of a first polarity;
    a first zero reactive voltage period immediately following the first high-voltage period; and
    a second high-voltage period of an opposite voltage polarity to the first polarity immediately following the first zero reactive voltage period.

11. A method according to claim 6, wherein processing the receive signal during at least part of the second period produces a soil signal dependent upon at least signals from soil, the soil illuminated by the transmit magnetic field during the first period, and wherein processing of the receive signal during at least part of the first period produces a first processed signal, a component of the first processed signal being directly proportional to an instantaneous non-zero reactive voltage across the magnetic field transmitter, and a further component of the first processed signal being dependent upon the soil signal, wherein a proportion of the soil signal is subtracted from the first processed signal to produce a reactive signal such that the reactive signal is substantially directly proportional to the instantaneous reactive voltage and being substantially independent of the soil signal.

12. A method according to claim 11, wherein processing of the receive signal during the zero reactive voltage period produces a second processed signal, a component of the second processed signal being dependent upon a component of the reactive signal, and a further component of the second processed signal being approximately independent of the soil signal, and the further processing of the reactive signal includes subtracting a proportion of the reactive signal from the second processed signal to produce a reactive balanced signal such that the reactive balanced signal is substantially independent of the reactive signal, and further processing the reactive balanced signal to produce the indicator signal.

13. A method according to claim 12, wherein processing of the reactive balanced signal includes adding a proportion of the soil signal to the reactive balanced signal to produce a ground balanced signal such that the ground balanced signal is substantially independent of signals from soil, the soil illuminated by the transmit magnetic field during the first period.

14. A method according to claim 11, wherein the signals from soil includes resistive components substantially independent of frequencies within an effective receive bandwidth of the magnetic field receiver.

15. A method according to claim 11, wherein the signals from soil includes log-linear frequency-dependent resistive components within an effective receive bandwidth of the magnetic field receiver.

16. A method according to claim 10, wherein the first period precedes the second period, and the second period is followed by a third period, the third period being a transmit period which precedes a fourth period, the fourth period being a zero-transmit period;
wherein the third period includes:
a third high-voltage period of a polarity opposite to the first polarity;
a second zero reactive voltage period immediately following the third high-voltage period; and
a fourth high-voltage period of the same voltage polarity as the first polarity immediately following the second zero reactive voltage period.

17. A method according to claim 6, wherein processing of the receive signal includes synchronously demodulating the receive signal with a first synchronous demodulation multiplication function during the zero reactive voltage period to produce a first output signal, synchronously demodulating the receive signal with a second synchronous demodulation multiplication function during the second period, to produce a second output signal, and further processing the first and second output signal to produce the indicator signal.

18. A method according to claim 6, wherein processing of the receive signal includes processing the receive signal during at least a part of the zero reactive voltage period produces a first output signal, and processing the receive signal during at least a part of the second period produces a second output signal, and further processing the first and second output signal to produce the indicator signal.

19. A method according to claim 6, wherein processing the receive signal during at least part of the second period produces at least two processed signals, a first processed signal being more dependent upon a rate of change of environmental static fields applied to the magnetic field receiver than is a second processed signal; and a signal proportional to the first processed signal is subtracted from the second processed signal to produce a signal substantially independent of the rate of change of environmental static fields applied to the magnetic field receiver, and a further processing of the signal substantially independent of the rate of change of environmental static fields applied to the magnetic field receiver produces the indicator signal.

20. A method according to claim 6, wherein processing the receive signal during at least part of the second period produces a first processed signal and processing the receive signal during at least part of the first period produces a third processed signal, the first processed signal being more dependent upon a rate of change of environmental static fields applied to the magnetic field receiver than is the third processed signal; and a signal proportional to the first processed signal is subtracted from the third processed signal to produce a signal substantially independent of the rate of change of environmental static fields applied to the magnetic field receiver, and a further processing of the signal substantially independent of the rate of change of environmental static fields applied to the magnetic field receiver produces the indicator signal.

21. A method according to claim 1, wherein the transmit electronics includes a transmit/receive switch controlled by the control signal, at least a first element of the transmit/receive switch is controlled to be in either a switched on state or a switched off state, wherein an effective series dynamic resistance of the first element when in a switched on state is lower than the effective series dynamic resistance of the first element when in a switched off state, and wherein the first element is in a switched on state during the first period to provide an alternative path with lower resistance than that of the damping resistor for the current flowing through the magnetic field transmitter to flow to the second potential, and wherein the first element is in a switched off state during the second period such that the current flowing through the magnetic field transmitter flows to the first potential through the damping resistor.

22. A method according to claim 21, wherein the first element is in the switched off state when the current flowing through the magnetic field transmitter is substantially zero.

23. A method according to claim 21, wherein at least 95% of a current flowing through the magnetic field transmitter flows through the first element when the current flowing through the magnetic field transmitter is at a maximum during periods while the first element is in the switched on state.

24. A method according to claim 21, wherein the transmit/receive switch further includes a second element connected to the first element that is controlled by a control circuitry to be in either a switched on state or a switched off state, wherein an effective series dynamic resistance of the second element while in a switched on state is lower than the effective series dynamic resistance of the second element while in a switched off state, wherein the method includes the step of:
galvanically isolating the control circuitry from the transmit electronics during at least a part of the second period when the first element is in a switched off state and the second element is in a switched on state, wherein the second element is in a switched on state for at least part of the first period, and wherein at least 95% of the current flowing through the magnetic field transmitter flows through the second element when the current flowing through the magnetic field transmitter is at a maximum while the second element is in the switched on state.

25. A method according to claim 24, wherein at least 95% of the current flowing through the magnetic field transmitter flows through both the second element and the first element at least when the magnetic field transmitter current is at a maximum during the periods when both the first element and the second element are in the switched on state.

26. A method according to claim 21, wherein the first element includes a field-effect Transistor which is controlled to be in a switched off state during at least part of the second period, and controlled to be in a switched on state during at least part of the first period.

27. A method according to claim 21, wherein the first element includes a Bipolar Junction Transistor which is controlled to be in a switched off state during at least part of the second period, and controlled to be in a switched on state during at least part of the first period.

28. A method according to claim 21, wherein the damping resistor is connected in parallel with the first element.

29. A method according to claim 1, wherein the first potential is the same as the second potential.

30. A method according to claim 1, wherein either or both of the first and second potentials are zero.

31. A metal detector configurable to perform the method defined in claim 1.

* * * * *